United States Patent
Kirkwood et al.

(10) Patent No.: US 7,211,019 B2
(45) Date of Patent: *May 1, 2007

(54) TORQUE VECTORING DRIVE MECHANISM HAVING A POWER SHARING CONTROL SYSTEM

(75) Inventors: Malcolm E. Kirkwood, Livonia, MI (US); Thomas C. Bowen, Rochester Hills, MI (US)

(73) Assignee: Magna Powertrain USA, Inc., Troy, MI (US)

( * ) Notice: Subject to any disclaimer, the term of this patent is extended or adjusted under 35 U.S.C. 154(b) by 226 days.

This patent is subject to a terminal disclaimer.

(21) Appl. No.: 11/043,795

(22) Filed: Jan. 26, 2005

(65) Prior Publication Data

US 2005/0176543 A1    Aug. 11, 2005

Related U.S. Application Data

(63) Continuation-in-part of application No. 10/973,071, filed on Oct. 25, 2004, now Pat. No. 6,945,375, which is a continuation of application No. 10/371,415, filed on Feb. 21, 2003, now Pat. No. 6,808,053.

(51) Int. Cl.
    *F16H 37/08* (2006.01)
(52) U.S. Cl. ..................... 475/205; 192/84.7
(58) Field of Classification Search ............ 475/5, 475/203, 204, 205, 221; 192/35, 84.5, 84.7, 192/84.91, 84.94; 74/89.31; 180/248–250, 180/233
    See application file for complete search history.

(56) References Cited

U.S. PATENT DOCUMENTS 672,620 A    6/1901    Buffum
856,703 A    6/1907    Iversen
1,382,289 A    6/1921    Janicki
1,954,686 A    4/1934    Stickney
1,964,956 A    7/1934    Lincoln
2,466,683 A    4/1949    Buckendale
3,235,045 A *  2/1966    Pop .................. 192/18 B
3,690,426 A    9/1972    Weisgerber (Continued)

FOREIGN PATENT DOCUMENTS

DE    3908478 A1    5/1989

(Continued)

*Primary Examiner*—Charles A. Marmor
*Assistant Examiner*—Justin K Holmes
(74) *Attorney, Agent, or Firm*—Harness, Dickey & Pierce, P.L.C.

(57) ABSTRACT

A torque transfer mechanism is provided for controlling the magnitude of a clutch engagement force exerted on a multi-plate clutch assembly that is operably disposed between a first rotary and a second rotary member. The torque transfer mechanism includes a clutch actuator assembly for generating and applying a clutch engagement force on the clutch assembly. The clutch actuator assembly includes an electric motor/brake unit and a torque/force conversion mechanism. The motor/brake unit can be operated in either of a motor mode or a brake mode to cause bi-directional linear movement of an output member of the torque/force conversion mechanism. The thrust force generated by the torque/force conversion mechanism is applied to the clutch assembly. The dual mode feature of the electric motor/brake unit significantly reduces the power requirements. A torque vectoring drive axle is equipped with a pair of such torque transfer mechanisms.

20 Claims, 18 Drawing Sheets

U.S. PATENT DOCUMENTS

| | | | |
|---|---|---|---|
| 4,691,593 A | 9/1987 | Mueller | |
| 4,757,728 A | 7/1988 | Pitsch | |
| 4,763,747 A | 8/1988 | Muller | |
| 5,370,588 A | 12/1994 | Sawase et al. | |
| 5,415,598 A | 5/1995 | Sawase et al. | |
| 5,456,641 A | 10/1995 | Sawase | |
| 5,632,185 A | 5/1997 | Gassmann | |
| 5,699,888 A | 12/1997 | Showalter | |
| 5,904,634 A | 5/1999 | Teraoka | |
| 5,910,064 A | 6/1999 | Kuroki | |
| 5,911,291 A | 6/1999 | Suetake et al. | |
| 5,947,855 A * | 9/1999 | Weiss | 475/5 |
| 6,120,407 A | 9/2000 | Mimura | |
| 6,213,241 B1 | 4/2001 | Kita et al. | |
| 6,378,677 B1 | 4/2002 | Kuroda et al. | |
| 6,394,246 B1 | 5/2002 | Gassmann et al. | |
| 6,484,857 B2 * | 11/2002 | Vonnegut et al. | 192/35 |
| 6,520,880 B1 | 2/2003 | Fukushima et al. | |
| 6,533,090 B2 | 3/2003 | Osborn et al. | |
| 6,616,566 B2 | 9/2003 | Gorlich | |
| 6,645,108 B1 | 11/2003 | Gradu | |
| 6,808,053 B2 | 10/2004 | Kirkwood et al. | |
| 7,004,874 B2 * | 2/2006 | Mizon et al. | 475/198 |
| 7,044,880 B2 * | 5/2006 | Bowen | 475/205 |
| 7,059,992 B1 * | 6/2006 | Bowen | 475/205 |
| 7,083,539 B2 * | 8/2006 | Bowen | 475/205 |
| 2006/0205555 A1 * | 9/2006 | Bowen | 475/204 |
| 2006/0293141 A1 * | 12/2006 | Sharma et al. | 475/204 |

FOREIGN PATENT DOCUMENTS

| | | |
|---|---|---|
| JP | 62-18117 | 1/1987 |
| JP | 3-66927 | 3/1991 |
| WO | WO 02/09966 A1 | 2/2002 |

* cited by examiner

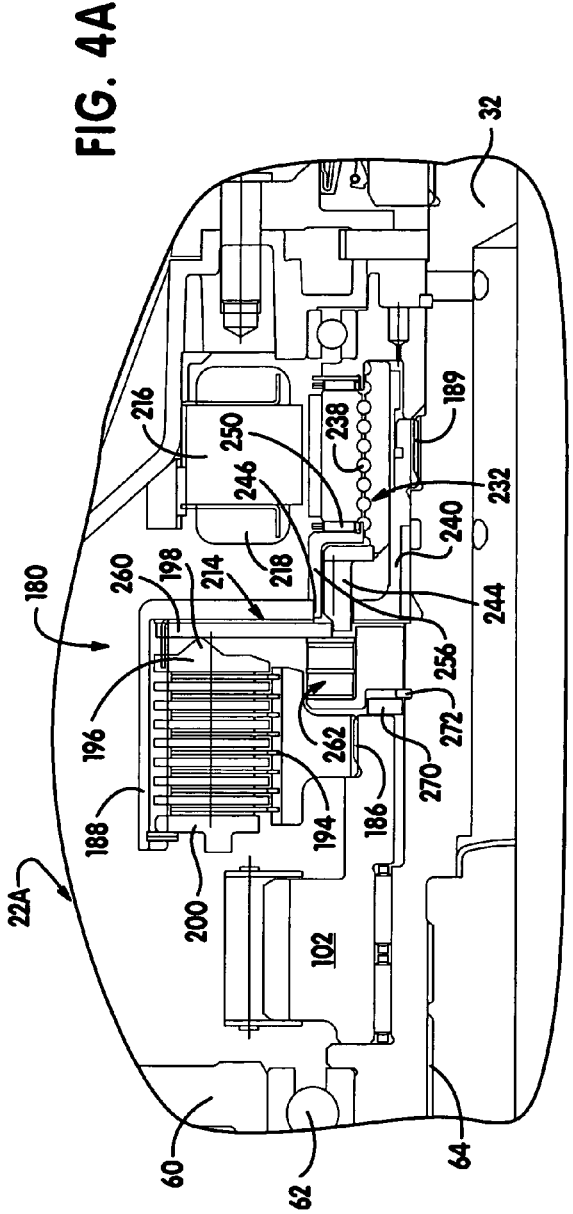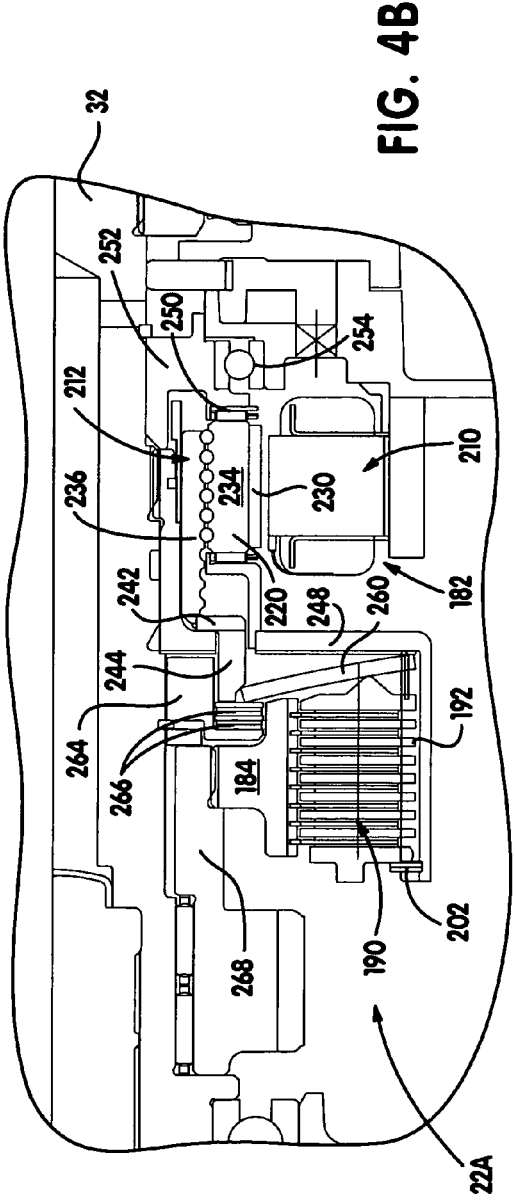

TORQUE VECTORING DRIVE MECHANISM HAVING A POWER SHARING CONTROL SYSTEM

CROSS-REFERENCE TO RELATED APPLICATIONS

This application is a continuation-in-part of U.S. Ser. No. 10/973,071 filed Oct. 25, 2004, now U.S. Pat. No. 6,945,375 which is a continuation Ser. No. 10/371,415 filed Feb. 21, 2003, now U.S. Pat. No. 6,808,053.

FIELD OF THE INVENTION

The present invention relates generally to power transfer systems for controlling the distribution of drive torque between the front and rear drivelines of a four-wheel drive vehicle and/or the left and right wheels of an axle assembly. More particularly, the present invention is directed to a power transmission device for use in motor vehicle driveline applications having a pair of torque transfer mechanisms which are each equipped with a power-operated clutch actuator that is operable for controlling actuation of a multi-plate friction clutch.

BACKGROUND OF THE INVENTION

In view of increased demand for four-wheel drive vehicles, a plethora of power transfer systems are currently being incorporated into vehicular driveline applications for transferring drive torque to the wheels. In many vehicles, a power transmission device is operably installed between the primary and secondary drivelines. Such power transmission devices are typically equipped with a torque transfer mechanism for selectively and/or automatically transferring drive torque from the primary driveline to the secondary driveline to establish a four-wheel drive mode of operation.

A modern trend in four-wheel drive motor vehicles is to equip the power transmission device with an adaptively controlled transfer clutch. The transfer clutch is operable for automatically directing drive torque to the secondary wheels, without any input or action on the part of the vehicle operator, when traction is lost at the primary wheels for establishing an "on-demand" four-wheel drive mode. Typically, the transfer clutch includes a multi-plate clutch assembly that is installed between the primary and secondary drivelines and a clutch actuator for generating a clutch engagement force that is applied to the clutch assembly. The clutch actuator can be a power-operated device that is actuated in response to electric control signals sent from an electronic controller unit (ECU). Variable control of the electric control signal is typically based on changes in current operating characteristics of the vehicle (i.e., vehicle speed, interaxle speed difference, acceleration, steering angle, etc.) as detected by various sensors. Thus, such "on-demand" transfer clutch can utilize adaptive control schemes for automatically controlling torque distribution during all types of driving and road conditions.

To further enhance the tractive and stability characteristics of four-wheel drive vehicles, it is known to equip such vehicles with brake-based electronic stability control systems and/or traction distributing axle assemblies. Typically, such axle assemblies include a drive mechanism that is operable for adaptively regulating the side-to-side (i.e., left-right) torque and speed characteristics between a pair of drive wheels. In some instances, a pair of modulatable clutches are used to provide this side-to-side control as is disclosed, for example, in U.S. Pat. Nos. 6,378,677 and 5,699,888. As an alternative, a hydraulically-operated traction distribution axle assembly is shown in U.S. Pat. No. 6,520,880. Additional traction distributing axle assemblies are disclosed in U.S. Pat. Nos. 5,370,588 and 6,213,241.

While many on-demand clutch control systems similar to those described above are currently used motor vehicles, a need exists to advance the technology and address recognized system limitations. For example, the size and weight of the friction clutch components and the electrical power requirements of the clutch actuator needed to provide the large clutch engagement loads may make such system cost prohibitive in some four-wheel drive vehicle applications. In an effort to address these concerns, new technologies are being considered for use in power-operated clutch actuator applications.

SUMMARY OF THE INVENTION

Thus, its is an object of the present invention to provide a power transmission device for use in a motor vehicle having a torque transfer mechanism equipped with a power-operated clutch actuator that is operable to control engagement of a multi-plate clutch assembly.

As a related object, the torque transfer mechanism of the present invention is well-suited for use in motor vehicle driveline applications to control the transfer of drive torque between a first rotary member and a second rotary member.

According to a further object of the present invention, the torque transfer mechanism and a control system are used for adaptively controlling the transfer of drive torque between a first rotary member and a second rotary member in a power transmission devices of the type used in motor vehicle driveline applications. The torque transfer mechanism includes a multi-plate friction clutch assembly operably disposed between the first and second rotary members and a clutch actuator assembly for generating a clutch engagement force to be exerted on the clutch assembly. The clutch actuator assembly preferably includes an electric motor/brake unit, a torque/force conversion mechanism and a force amplification mechanism. The electric motor/brake unit can be switched by the control system between a motor (i.e., torque producing) mode and a brake (i.e., torque absorbing) mode for generating an output torque that is converted by the torque/force conversion mechanism into an axially-directed thrust force. Thereafter, the thrust force is amplified by the force amplification mechanism to define the clutch engagement force.

According to another object of the present invention, the control system operates the motor/brake unit in its motor mode when the speed of one of the rotary members is less than a predetermined threshold speed value so as to drive a rotor of the motor/brake unit which causes axial movement of an output member of the torque/force conversion mechanism. The control system switches the motor/brake unit into its brake mode when the rotary speed exceeds the threshold speed value so as to apply a dynamic brake torque to the rotor for controlling axial movement of the output member of the torque/force conversion mechanism. In addition, the present invention provides a clutch actuator assembly utilizing a low torque motor which acts as an electric generator so as to significantly reduce the electrical power requirements needed to adaptively control torque transfer through the clutch assembly.

According to yet another object of the present invention, the torque transfer mechanism is adapted for use in a power transmission device for adaptively controlling the drive torque transferred between a primary driveline and a secondary driveline. According to one preferred application, the power transmission device of the present invention is a transfer case with the torque transfer mechanism arranged as a torque transfer coupling for providing on-demand torque transfer from the primary driveline to the secondary driveline. In a related application, the torque transfer mechanism is arranged as a torque bias coupling for varying the torque distribution and limiting interaxle slip between the primary and secondary drivelines. According to another preferred application, the power transmission device is a torque distributing assembly with the torque transfer mechanism arranged as a torque bias coupling to control speed differentiation and torque distribution across a differential unit.

In accordance with another objective of the present invention, the control system is provided for use in driveline applications equipped with two or more torque couplings that are operable to control coordinated actuation of each electric motor/brake unit. In particular, switching each of the motor/brake units between operation in their motor and brake modes permits regenerated electrical power to be used, thereby significantly reducing the electrical power requirements from the vehicle's host system.

As a related object of the present invention, a drive axle assembly having a torque distributing drive mechanism and an active yaw control system are disclosed. The torque distributing drive mechanism includes a differential and first and second electric motor/brake units. The differential functions to transfer drive torque from the vehicle's powertrain to first and second axleshafts while permitting speed differentiation therebetween. The first motor/brake unit is operable for selectively increasing or decreasing the rotary speed of the first axleshaft while the second motor/brake unit is similarly arranged for selectively increasing or decreasing the rotary speed of the second axleshaft. Accordingly, selective control over actuation of one or both of the motor/brake units provides adaptive control of the speed differentiation and drive torque transferred between the first and second axleshafts. The active yaw control system includes sensors for detecting a vehicle yaw condition and a controller for switching the motor/brake units between their motor and brake modes to adaptively vary the rotary speed of one or both axleshafts to counteract the yaw condition.

In accordance with these objectives, the torque distributing drive mechanism includes a differential, at least one speed changing unit, and first and second torque couplings that are operable to selectively vary the rotary speed of one axleshaft so as to cause corresponding variation in the rotary speed of the other axleshaft. Each torque coupling includes a multi-plate friction clutch and a clutch actuator assembly having an electric motor/brake unit.

In accordance with a first embodiment, the drive axle assembly of the present invention includes first and second axleshafts and a torque distributing drive mechanism that is operable to selectively couple a driven input shaft to one or both of the axleshafts. The drive mechanism includes a differential assembly, a planetary gear assembly, and first and second torque couplings. The planetary gear assembly is operably disposed between the differential assembly and the first axleshafts. The first torque coupling is operable in association with the planetary gear assembly to increase the rotary speed of the first axleshaft which, in turn, causes the differential assembly to decrease the rotary speed of the second axleshaft. In contrast, the second torque coupling is operable in association with the planetary gear assembly to decrease the rotary speed of the first axleshaft so as to cause the differential assembly to increase the rotary speed of the second axleshaft. Accordingly, selective control over actuation of one or both of the first and second torque couplings provides adaptive control of the speed differentiation and the torque transferred between the first and second axleshafts.

According to a second embodiment, the drive axle assembly of the present invention includes first and second axleshafts and a torque distributing drive mechanism that is operable for transferring drive torque from a driven input shaft to the first and second axleshafts. The torque distributing drive mechanism includes a differential, first and second speed changing units, and first and second torque couplings. The differential includes an input component driven by the input shaft, a first output component driving the first axleshaft and a second output component driving the second axleshaft. The first speed changing unit includes a first planetary gearset having a first sun gear driven by the first output component, a first ring gear, and a set of first planet gears rotatably supported by the input component and which are meshed with the first ring gear and the first sun gear. The second speed changing unit includes a second planetary gearset having a second sun gear driven by the second output component, a second ring gear, and a set of second planet gears rotatably supported by the input component and which are meshed with the second ring gear and the second sun gear. The first torque coupling is operable for selectively braking rotation of the first ring gear. Likewise, the second torque coupling is operable for selectively braking rotation of the second ring gear. Accordingly, selective control over actuation of the first and second torque couplings provides adaptive control of the speed differentiation and the torque transferred between the first and second axleshafts.

In accordance with a third embodiment of a drive axle assembly according to the present invention, the torque distributing drive mechanism includes a differential, first and second speed changing units, and first and second torque couplings. The differential includes an input component driven by the input shaft and first and second output components. The first speed changing unit is a first planetary gearset having a first sun gear driving the first axleshaft, a first ring gear driven by the first output component, and a set of first planet gears rotatably supported by the input component and which are meshed with the first sun gear and the first ring gear. The second speed changing unit is a second planetary gearset having a second sun gear driving the second axleshaft, a second ring gear driven by the second output component, and a set of second planet gears rotatably supported by the input component and which are meshed with the second sun gear and the second ring gear. The first torque coupling is again operable for selectively braking rotation of the first ring gear while the second torque coupling is operable for selectively braking rotation of the second ring gear. The control system controls actuation of the first and second torque couplings for controlling the speed differentiation and torque transferred between the first and second axleshafts.

In accordance with a fourth embodiment, a drive axle assembly according to the present invention includes first and second axleshafts and a torque distributing drive mechanism that is operable for transferring drive torque from a driven input shaft to the first and second axleshafts. The torque distributing drive mechanism includes a differential, first and second speed changing units, and first and second torque couplings. The differential includes an input component driven by the input shaft, a first output component driving the first axleshaft and a second output component driving the second axleshaft. The first speed changing unit includes a first planetary gearset having a first planet carrier driven with the first output component, a first ring gear driven by the input component, a first sun gear, and a set of first planet gears rotatably supported by the first planet carrier and which are meshed with the first ring gear and the first sun gear. The second speed changing unit includes a second planetary gearset having a second planet carrier driven with the second output component, a second ring gear driven by the input component, a second sun gear, and a set of second planet gears rotatably supported by the second planet carrier and which are meshed with the second ring gear and the second sun gear. The first torque coupling is operable for selectively braking rotation of the first sun gear. Likewise, the second torque coupling is operable for selectively braking rotation of the second sun gear. Accordingly, selective control over actuation of the first and second torque couplings provides adaptive control of the speed differentiation and the torque transferred between the first and second axleshafts.

According to a fifth embodiment, the drive axle assembly of the present invention includes first and second axleshafts and a torque distributing drive mechanism that is operable for transferring drive torque from a driven input shaft to the first and second axleshafts. The torque distributing drive mechanism includes a differential, a speed changing unit, and first and second torque couplings. The differential includes an input component driven by the input shaft, a first output component driving the first axleshaft and a second output component driving the second axleshaft. The speed changing unit includes a first shaft commonly driven with the first axleshaft, a second shaft commonly driven with the second axleshaft, and first and second gearsets driven by the first shaft. The first torque coupling is operable for selectively coupling the first gearset to the second shaft. Likewise, the second torque coupling is operable for selectively coupling the second gearset to the second shaft. Accordingly, selective control over actuation of one or both of the first and second torque couplings provides adaptive control of the speed differentiation and the torque transferred between the first and second axleshafts.

Further objectives, features and advantages of the present invention will become apparent by reference to the following detailed description of the preferred embodiments and the appended claims when taken in conjunction with the accompanying drawings.

BRIEF DESCRIPTION OF THE DRAWINGS

Further objects, features and advantages of the present invention will become apparent to those skilled in the art from analysis of the following written description, the appended claims, and accompanying drawings in which:

FIGS. 4A and 4B are partial sectional views of the transfer case equipped with a torque transfer mechanism according to an alternative embodiment of the present invention;

DETAILED DESCRIPTION OF THE PREFERRED EMBODIMENTS

The present invention is directed to torque transfer mechanisms that can be adaptively controlled for modulating the torque transferred between first and second rotary members. The torque transfer mechanism finds particular application in power transmission devices for use in motor vehicle drivelines such as, for example, an on-demand transfer clutch in a transfer case or an in-line torque coupling, a biasing clutch associated with a differential assembly in a transfer case or a drive axle assembly, or in torque vectoring differential assemblies. Thus, while the present invention is hereinafter described in association with particular power transmission devices for use in specific driveline applications, it will be understood that the arrangements shown and described are merely intended to illustrate embodiments of the present invention.

Figure 1:
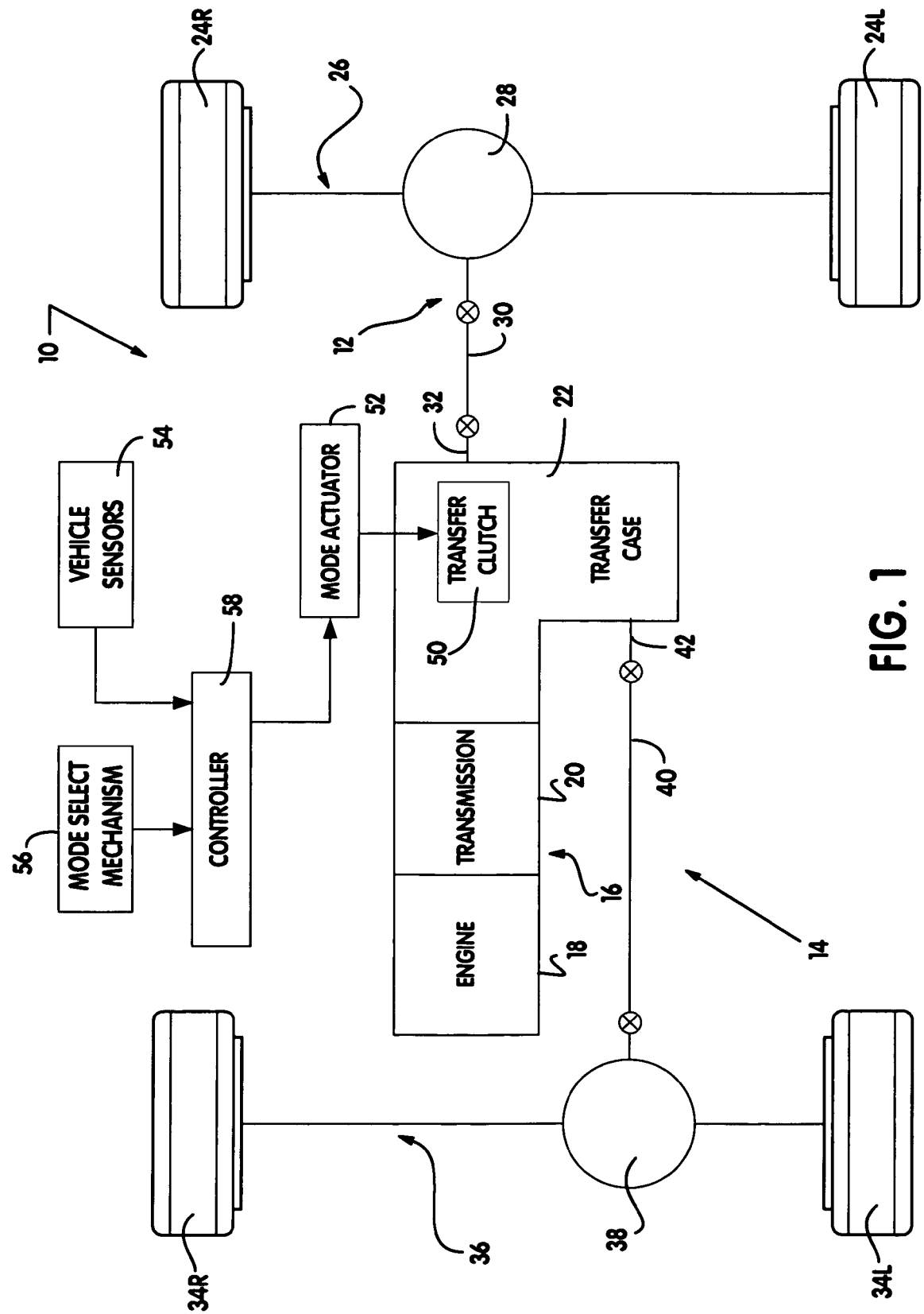
FIG. 1 illustrates the drivetrain of a four-wheel drive vehicle equipped with a power transmission device according to the present invention.

With particular reference to FIG. 1 of the drawings, a drivetrain 10 for a four-wheel drive vehicle is shown. Drivetrain 10 includes a primary driveline 12, a secondary driveline 14, and a powertrain 16 for delivering rotary tractive power (i.e., drive torque) to the drivelines. In the particular arrangement shown, primary driveline 12 is the rear driveline while secondary driveline 14 is the front driveline. Powertrain 16 includes an engine 18, a multi-speed transmission 20, and a power transmission device hereinafter referred to as transfer case 22. Rear driveline 12 includes a pair of rear wheels 24L and 24R connected at opposite ends of a rear axle assembly 26 having a rear differential 28 coupled to one end of a rear prop shaft 30, the opposite end of which is coupled to a rear output shaft 32 of transfer case 22. Likewise, front driveline 14 includes a pair of front wheels 34L and 34R connected at opposite ends of a front axle assembly 36 having a front differential 38 coupled to one end of a front prop shaft 40, the opposite end of which is coupled to a front output shaft 42 of transfer case 22.

With continued reference to the drawings, drivetrain 10 is shown to further include an electronically-controlled power transfer system for permitting a vehicle operator to select between a two-wheel drive mode, a locked ("part-time") four-wheel drive mode, and an adaptive ("on-demand") four-wheel drive mode. In this regard, transfer case 22 is equipped with a transfer clutch 50 that can be selectively actuated for transferring drive torque from rear output shaft 32 to front output shaft 42 for establishing both of the part-time and on-demand four-wheel drive modes. The power transfer system further includes a power-operated mode actuator 52 for actuating transfer clutch 50, vehicle sensors 54 for detecting certain dynamic and operational characteristics of the motor vehicle, a mode select mechanism 56 for permitting the vehicle operator to select one of the available drive modes, and a controller 58 for controlling actuation of mode actuator 52 in response to input signals from vehicle sensors 54 and mode selector 56.

Figure 2:
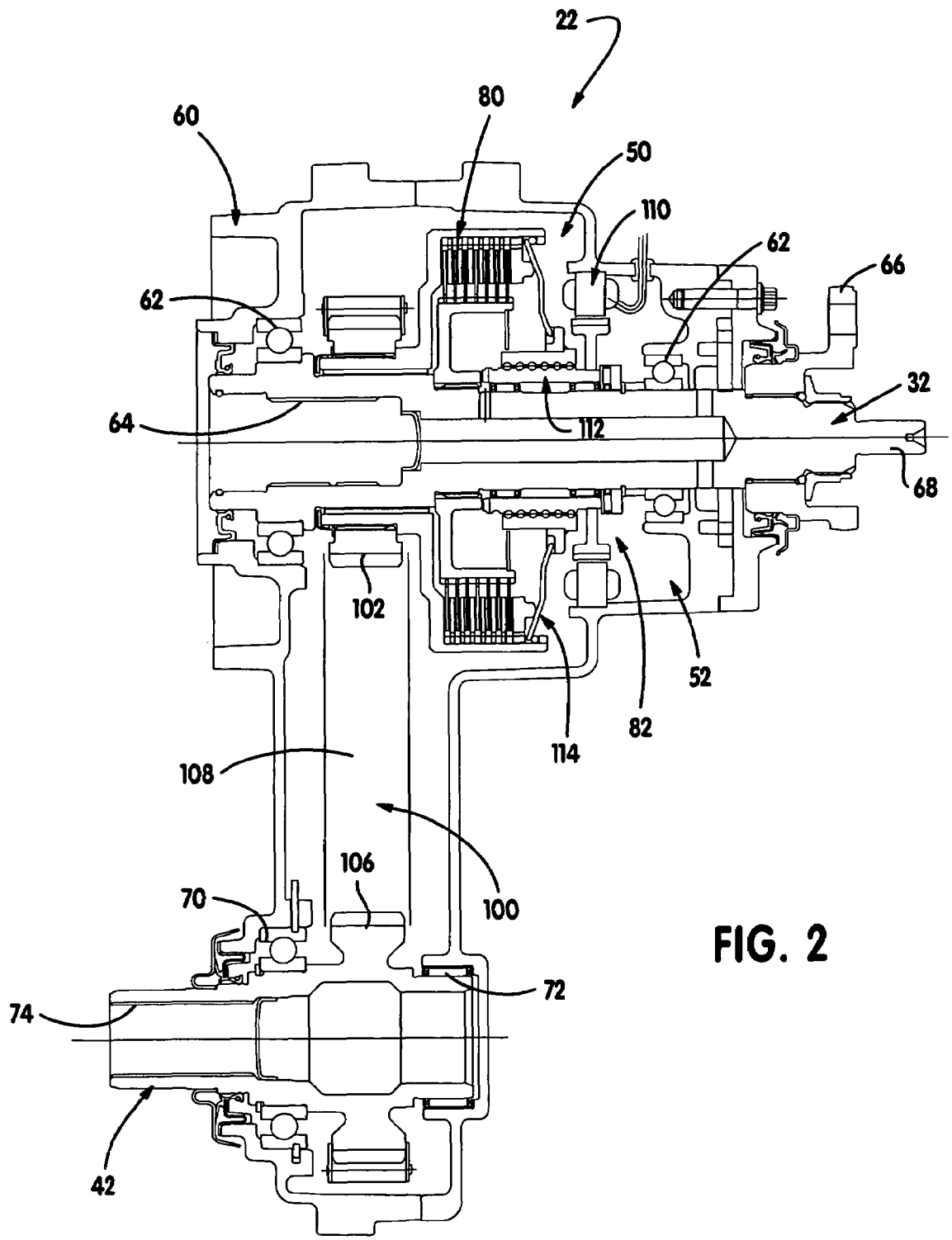
FIG. 2 is a sectional view of a transfer case associated with the drivetrain shown in FIG. 1 and which is equipped with a torque transfer mechanism according to the present invention.

Transfer case 22 is shown in FIG. 2 to include a multi-piece housing 60 from which rear output shaft 32 is rotatably supported by a pair of laterally-spaced bearing assemblies 62. Rear output shaft 32 includes an internally-splined first end segment 64 adapted for connection to the output shaft of transmission 20 and a yoke assembly 66 secured to its second end segment 68 that is adapted for connection to rear propshaft 30. Front output shaft 42 is likewise rotatably supported from housing 60 by a pair of laterally-spaced bearing assemblies 70 and 72 and includes an internally-splined end segment 74 that is adapted for connection to front propshaft 40.

Transfer clutch 50 is a multi-plate friction clutch assembly 80 and mode actuator 52 is a power-operated clutch actuator assembly 82 which together define a torque transfer mechanism according to a preferred embodiment of the present invention. Friction clutch assembly 80 includes a hub 84 fixed via a spline connection 86 to rear output shaft 32, a drum 88, and a multi-plate clutch pack 90 that is operably disposed between hub 84 and drum 88. Clutch pack 90 includes a set of outer clutch plates 92 splined for rotation with drum 88 and which are interleaved with a set of inner clutch plates 94 splined for rotation with hub 84. Clutch assembly 80 further includes a pressure plate 96 that is splined for rotation with drum 88 and which has an annular rim flange 98 formed thereon. Pressure plate 96 is operably arranged to rotate with, and move axially relative to, drum 88 for exerting a compressive clutch engagement force on clutch pack 90. Such engagement of clutch pack 90 causes rotary power ("drive torque") to be transferred from rear output shaft 32 to front output shaft 42 via a transfer assembly 100. Transfer assembly 100 includes a first sprocket 102 fixed via a spline connection 104 for rotation with drum 88, a second sprocket 106 fixed for rotation with front output shaft 42, and a power chain 108 encircling sprockets 102 and 106. First sprocket 102 is shown fixed to a tubular stub shaft segment 89 of drum 88 which is rotatably supported on rear output shaft 32 via a suitable bearing assembly such as sleeve bushing 109.

As will be detailed, clutch actuator assembly 82 is operable for controlling axial movement of pressure plate 96 and thus, the magnitude of the clutch engagement force applied to clutch pack 90. In particular, pressure plate 96 is axially moveable relative to clutch pack 90 between a first or "released" position and a second or "locked" position. With pressure plate 96 in its released position, a minimum clutch engagement force is exerted on clutch pack 90 such that virtually no drive torque is transferred from rear output shaft 32 through clutch assembly 80 and transfer assembly 100 to front output shaft 42, thereby establishing the two-wheel drive mode. In contrast, movement of pressure plate 96 to its locked position causes a maximum clutch engagement force to be applied to clutch pack 90 such that front output shaft 42 is, in effect, coupled for common rotation with rear output shaft 32, thereby establishing the part-time four-wheel drive mode. Accordingly, control of the position of pressure plate 96 between its released and locked positions permits adaptive regulation of the amount of drive torque transferred from rear output shaft 32 to front output shaft 42, thereby establishing the on-demand four-wheel drive mode.

To provide means for moving pressure plate 96 between its released and locked positions, clutch actuator assembly 82 is shown to generally include an electric motor/brake unit 110, a torque/force conversion mechanism 112, and force amplification mechanism 114. Motor/brake unit 110 is an annular assembly which includes a stator 116 and a rotor 120. Stator 116 is shown to be non-rotationally secured to housing 60 and includes sets of windings, referred to as coil 118, which has its electrical lead wires 122 extending out of housing 60 via a sealed plug hole 124. Rotor 120 includes a plate segment 126 and an annular rim segment 128. As will be detailed, plate segment 126 of rotor 120 is fixed for rotation with a first component of torque/force conversion mechanism 112. As seen, rim segment 128 of rotor 120 has a plurality of permanent magnets 130 secured thereto which are arranged in close proximity to the field windings of coil 118. The annular configuration of motor/brake unit 110 permits simple assembly in concentric relation to rear output shaft 32 within housing 60. In addition, the packaging of motor/brake unit 110 inside housing 60 is advantageous in comparison to externally-mounted electric motor-type clutch actuators that are exposed to the hostile road and weather conditions associated with power transmission devices in motor vehicles.

Figure 3:
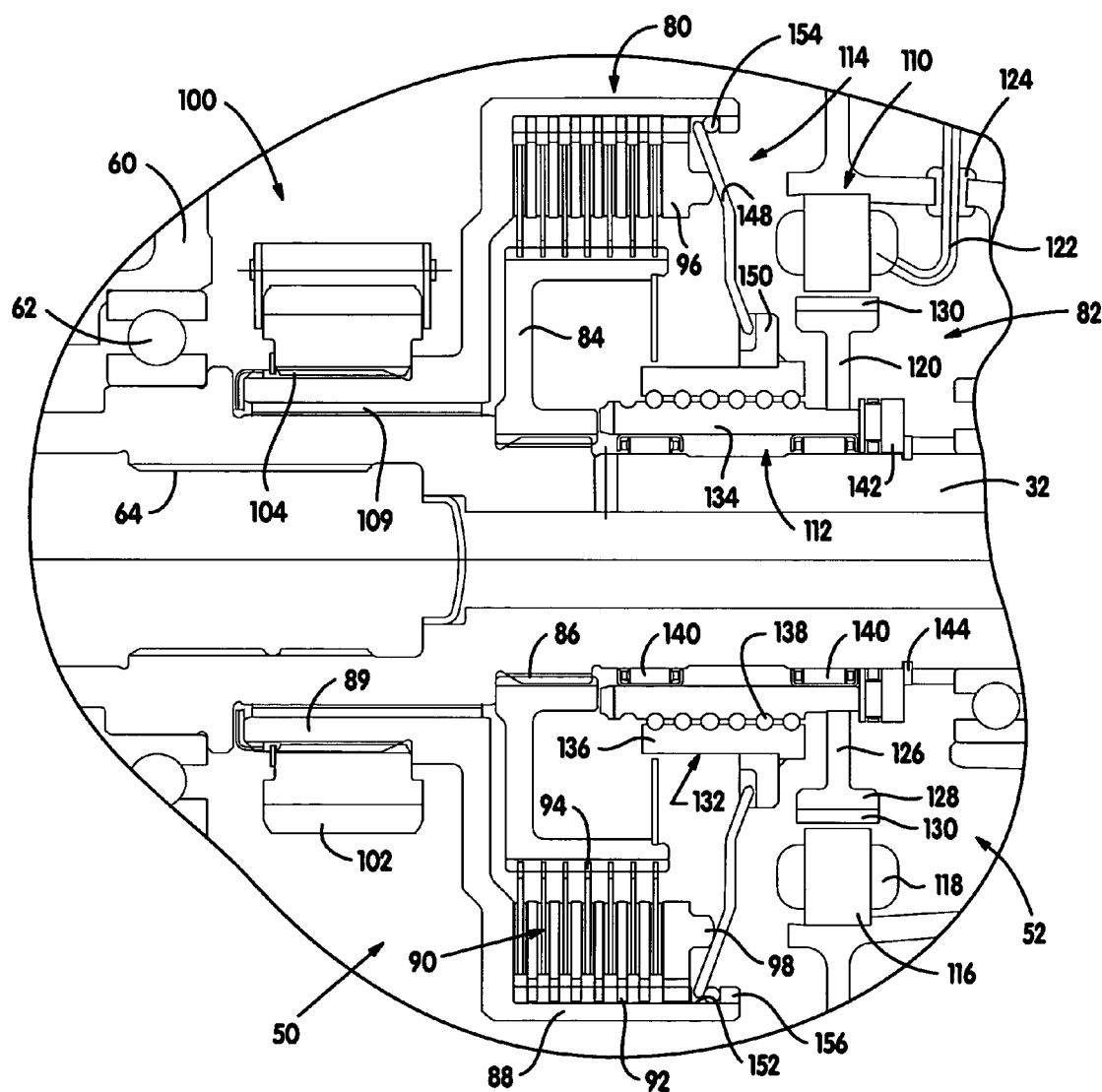
FIG. 3 is an enlarged partial view taken from FIG. 2 showing components of the torque transfer mechanism is greater detail.

Torque/force conversion mechanism 112 is shown in FIGS. 2 and 3 as a ball screw operator 132 having an externally-threaded screw 134, an internally-threaded nut 136 and balls 138 disposed in the aligned threads therebetween. Screw 134 is rotatably supported on rear output shaft 32 via a pair of needle bearing assemblies 140. Screw 134 is located and axially restrained between hub 84 and a thrust bearing assembly 142 via a snap ring 144. As seen, plate segment 126 of rotor 120 is fixed (i.e., welded, splined, etc.) for rotation with screw 134. Ball screw operator 132 is operable to cause axial movement of nut 136 relative to screw 134 in response to relative rotation therebetween. In this manner, the torque outputted from motor/brake unit 110 is converted into an axially-directed thrust force. This axially-directed thrust force is amplified and subsequently transferred to pressure plate 96 via force amplification mechanism 114. In some clutch applications, it may be possible to eliminate force amplification mechanism 114 and apply the thrust force outputted from ball screw operator 132 directly to pressure plate 96. Furthermore, it should be understood that ball screw operator 132 is merely one example of an applicable device for torque/force conversion mechanism 112 and that other devices capable of converting rotary motion into a linear force (i.e., ballramp units, cam plates, etc.) should be considered equivalent to that disclosed.

Force amplification mechanism 114 is shown to include a disk-type spring plate, such as a belleville spring 148, having a first end restrained against an annular retainer 150 fixed to nut 136 and a second end restrained in a circumferential groove 152 formed in drum 88. Preferably, belleville spring 148 has lugs at its outer peripheral edge that are coupled to drum 88 and lugs at its inner peripheral edge that are coupled to retainer 150. As such, belleville spring 148 couples nut 136 of ball screw operator 132 for common rotation with drum 88. In operation, when no torque is applied to rotor 120, screw 134 and nut 136 rotate together in response to rotation of drum 88.

To provide the desired force amplification characteristic, belleville spring 148 acts as a lever arm with an intermediate portion engaging rim flange 98 on pressure plate 96. A resilient ring 154 is retained in groove 152 between the outer end of belleville spring 148 and a reaction flange 156 that extends from drum 88. As is known, forward travel (i.e., to the left in FIG. 3) of nut 136 causes spring 148 to amplify the magnitude of the longitudinally-directed thrust force generated by ball screw operator 132 and apply the resultant clutch engagement force on pressure plate 96. The use of ball screw operator 132 in combination with disk spring 148 permits use of a low torque motor/brake unit 110. In operation, motor/brake unit 110 will be controlled in either of a first ("motor") mode or a second ("brake") mode for controlling the torque applied to rotor 120 so as to control relative rotation between screw 134 and nut 136, thereby controlling the magnitude of the clutch engagement force applied by pressure plate 96 on clutch pack 90.

Compared to conventional electrically-operated clutch actuator systems, the present invention provides significant operational advantages. For instance, clutch actuator assembly 82 requires only minimal electric power from the vehicle's host electrical supply system since, throughout most of its typical duty cycle, motor/brake unit 110 functions in its brake mode and acts as an absorber/generator for generating electrical power that can be dissipated or used to power one or more auxiliary electric devices such as, for example, an electric lube pump. Specifically, when the rotary speed of rear output shaft 32 is below a predefined threshold value, motor/brake unit 110 operates in its motor mode wherein coil 118 must be energized via an electrical control signal from controller 58 to drive rotor 120 in the appropriate rotary direction and through a desired amount of angular travel. Such controlled rotation of rotor 120 causes nut 136 of ball screw operator 132 to move axially relative to screw 134 in a corresponding direction and through a desired length of travel, thereby varying the magnitude of the clutch engagement force applied to clutch pack 90. The predefined threshold rotary speed value is preferably, but not limited to, about 150 rpm which equates to a vehicle rolling speed of about 5 mph. Thus, the torque transfer mechanism of the present invention only uses motor/brake unit 110 in its motor mode to control torque transfer requirements during low speed situations. For example, motor/brake unit 110 operates in its motor mode to control the transfer of drive torque to front output shaft 42 during a quick start or acceleration situation to avoid traction loss of rear wheels 24.

Once the rotary speed of rear output shaft 32 exceeds the predefined threshold value, the control system switches functions such that motor/brake unit 110 operates in its brake mode as an electric brake (absorber/generator) for creating (regenerating) electric power. In particular, when the rotary speed of rear output shaft 32 is above the threshold value, rotation of rotor 120 (caused by rotation of ball screw operator 132) causes magnets 130 to generate a voltage in the field windings of coil 118. However, since coil 118 is not energized, no torque is applied to rotor 120. As such, ball screw operator 132 continues to rotate as a unit and nut 136 does not move axially in either direction. Upon energization of coil 118, a brake torque is generated which acts to slow rotation of rotor 120 and thus slow rotation of screw 134 relative to nut 136, thereby causing axial travel of nut 136 relative to clutch pack 90. With motor/brake unit 110 operating in the brake mode, the control system functions to maintain a predetermined torque on ball screw operator 132 which, in turn, acts to control engagement of clutch pack 90 so as to generate the desired amount of torque transfer to front output shaft 42. Preferably, motor/brake unit 110 is a dc pemanetic magnetic device since it will not require a commutator or brushes.

In operation, when mode selector 56 indicates selection of the two-wheel drive mode, controller 58 signals electric motor/brake unit 110 to rotate screw 134 until nut 136 is located in a rearward or "retracted" position. Such action permits pressure plate 96 to move to its released position. If mode selector 56 thereafter indicates selection of the part-time four-wheel drive mode, coil 118 of electric motor/brake unit 110 is signaled by controller 58 to rotate screw 134 for axially advancing nut 136 until it is located in a forward or "extended" position. Such movement of nut 136 to its extended position acts to cause corresponding movement of pressure plate 96 to its locked position, thereby coupling front output shaft 42 to rear output shaft 32 through clutch assembly 80 and transfer assembly 100.

When mode selector 56 indicates selection of the on-demand four-wheel drive mode, controller 58 signals motor/brake unit 110 to rotate screw 134 until nut 136 is located in a "stand-by" position. This stand-by position may be its retracted position or, in the alternative, an intermediate position. In either case, a predetermined minimum amount of drive torque is delivered to front output shaft 42 through clutch assembly 80 which is considered to be in its "ready" condition. Thereafter, controller 58 determines when and how much drive torque needs to be transferred to front output shaft 42 based on the current tractive conditions and/or operating characteristics of the motor vehicle, as detected by sensors 54. Many control schemes are known in the art for determining a desired torque level to be transferred through a transfer clutch and adaptively controlling such actuation of the transfer clutch.

Referring now to FIGS. 4A and 4B, a modified version of transfer case 22 is identified by reference numeral 22A which includes a multi-plate friction clutch assembly 180 and a power-operated clutch actuator assembly 182 which together define a torque transfer mechanism according to another preferred embodiment of the present invention. Clutch assembly 180 includes a hub 184 fixed via a spline connection 186 to first sprocket 102, a drum 188 fixed via a spline connection 189 to rear output shaft 32, and a multi-plate clutch pack 190. Clutch pack 190 includes a set of outer clutch plates 192 splined for rotation with drum 188 which are alternatively interleaved with a set of inner clutch plates 194 that are splined for rotation with hub 184. Clutch assembly 180 further includes a pressure plate 196 that is splined for rotation with drum 188 and having an annular rim flange 198 formed thereon. A reaction plate 200 is splined to drum 188 and axially restrained thereon via a snap ring 202.

To provide means for moving pressure plate 196 between its released and locked positions, clutch actuator assembly 182 is generally shown to include an electric motor/brake unit 210, a torque/force conversion mechanism 212, and a force amplification mechanism 214. Motor/brake unit 210 includes an annular stator 216 that is secured to housing 60 and which has a coil 218, and a rotor 220 having a plurality of permanent magnets 230 secured thereto in close proximity to coil 218.

Torque/force conversion mechanism 212 is a ball screw operator 232 having an internally-threaded nut 234, an externally threaded screw 236, and balls 238 disposed in the aligned threads therebetween. Screw 236 is supported on an annular hub segment 240 of drum 188. A drive plate 242 is secured to one end of screw 236 and has a series of circumferentially aligned axially-extending pins 244. Pins 244 pass through a series of commonly aligned throughbores 246 formed in a plate segment 248 of drum 188. Nut 234 is shown to be formed integrally with rotor 220 and axially restrained between a pair of thrust washer assemblies 250. One of thrust washer assemblies 250 is disposed between a first end of nut 234 and a support plate 252 that is rotatably supported from housing via a bearing assembly 254. The other thrust washer assembly 250 is disposed between a second end of nut 234 and a cup-shaped retainer 256 that is secured to plate segment 248 of drum 188. Since drum 188 is driven by rear output shaft 32, the location of pins 244 within throughbores 246 causes screw 236 to likewise rotate in common with rear output shaft 32. As before, when no energy is applied/absorbed to drive/brake rotation of rotor 220, nut 234 rotates in unison with screw 236.

Ball screw operator 232 is operable to cause axial movement of screw 236 relative to nut 234 between its retracted and extended positions in response to relative rotation therebetween. The axially-directed thrust force generated by such axial movement of screw 234 is transferred from pins 244 to pressure plate 196 via force amplification mechanism 214. Force amplification mechanism 214 includes a series of disk levers 260 and having an outer end fixed via a spline connection to drum 188 and an inner end in engagement with the free end of pins 244. Levers 260 each have an intermediate portion engaging rim flange 198 on pressure plate 196. A return spring assembly 262 is disposed between hub 184 and disk levers 260 and includes a spring retainer 264 and a plurality of wave springs 266 disposed between a flange on spring retainer 264 and the inner end of disk levers 260 opposite pins 244. As seen, retainer 264 is located on rear output shaft 32 between an end of hub segment 268 of sprocket 102 by a thrust washer 270 and snap ring 272. Wave springs 266 are provided to bias disk levers 260 to a released position which, in turn, functions to bias screw 234 toward its retracted position.

The function and operation of motor/brake unit 210 is generally similar to that of motor/brake unit 110 in that energization of coil 218 in either of its motor and brake modes controls axial travel of screw 236 relative to nut 234. Screw 236 is moveable between its retracted and extended positions relative to nut 234 for causing pins 244 to pivot levers 260 so as to move pressure plate 196 between its corresponding released and locked positions. By way of example, screw 236 is shown in FIG. 4A in its retracted position and in FIG. 4B in its extended position. Spring assembly 262 is arranged to normally bias screw 236 toward its retracted position. Again, only minimal electric power is required from the vehicle's electrical system to precisely control engagement of clutch assembly 180 and thus, the drive torque transferred from rear output shaft 32 to front output shaft 42.

Figure 5:
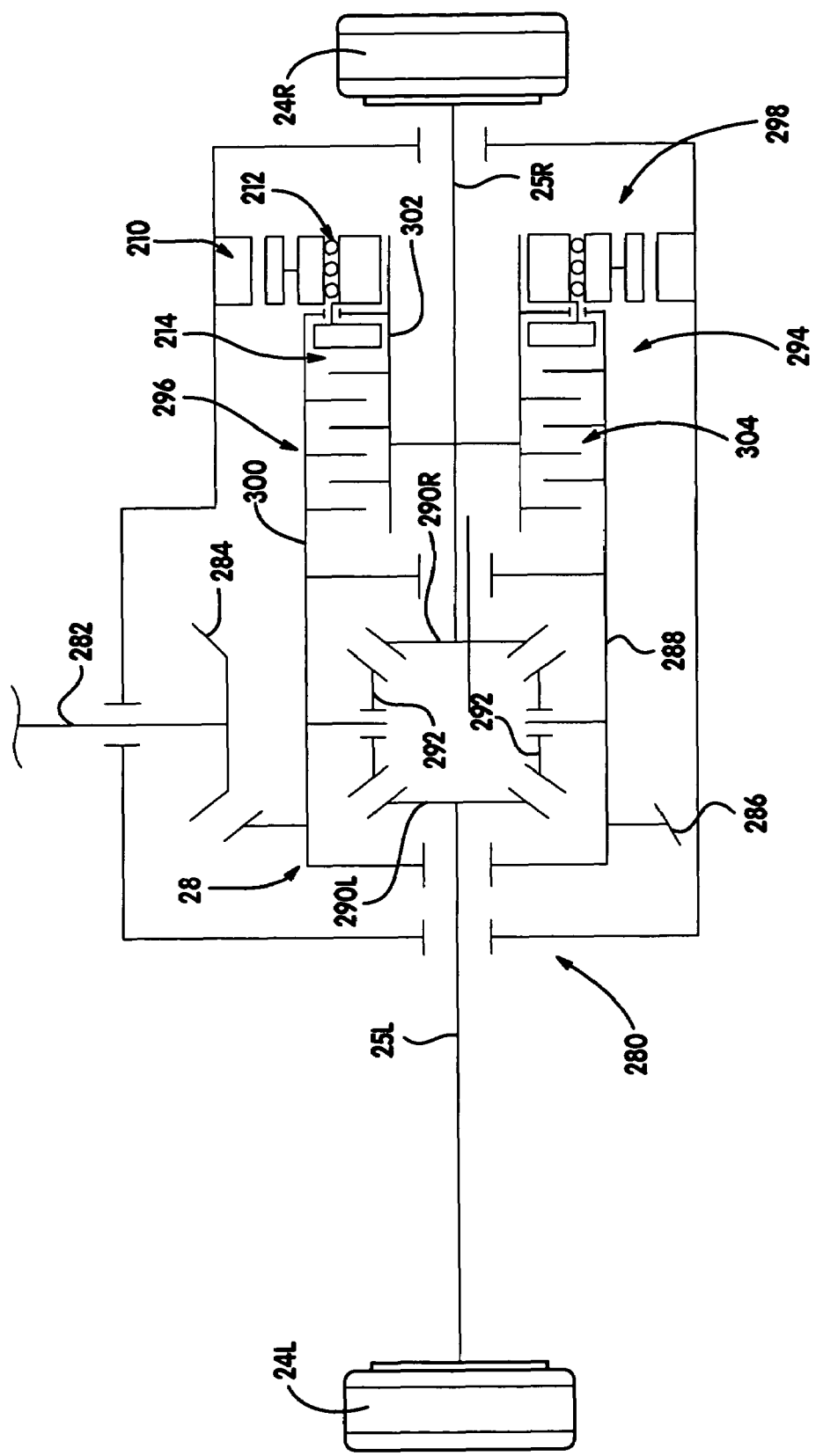
FIG. 5 illustrates a limited slip drive axle assembly equipped with a torque transfer mechanism according to the present invention.

Referring now to FIG. 5, a drive axle assembly 280 is shown which is generally a modified version of rear axle assembly 26 and which incorporates a torque transfer mechanism in association with rear differential 28 so as to permit adaptive control of the torque biasing and intra-axle speed differentiation between rear wheels 24L and 24R. Drive axle 280 includes a pinion shaft 282 driven by rear propshaft 30 which has a pinion gear 284 driving a hypoid ring gear 286 that is fixed to a carrier 288 of differential 28. Differential 28 also includes a left side gear 290L fixed to left axleshaft 25L, a right side gear 290R fixed to right axleshaft 25R, and pinion gears 292 driven by carrier 288 and meshed with both side gears. The torque transfer mechanism is shown as a torque bias coupling 294 having a multi-plate friction clutch assembly 296 that is operably disposed between carrier 288 and axleshaft 25R and a clutch actuator 298. Clutch assembly 296 includes a drum 300 fixed for rotation with carrier 288, a hub 302 fixed for rotation with axleshaft 25R, and a clutch pack 304 disposed therebetween. Clutch actuator assembly 298 is operable for controlling the magnitude of a clutch engagement force applied to clutch pack 304 and thus, the torque biasing between left wheel 24L and right wheel 24R. Clutch actuator assembly 298 is intended to be similar to one of clutch actuators 82 and 182 and is shown to include a motor/brake unit 210, a torque/force conversion mechanism 212 and a force amplification mechanism 214.

Figure 6:
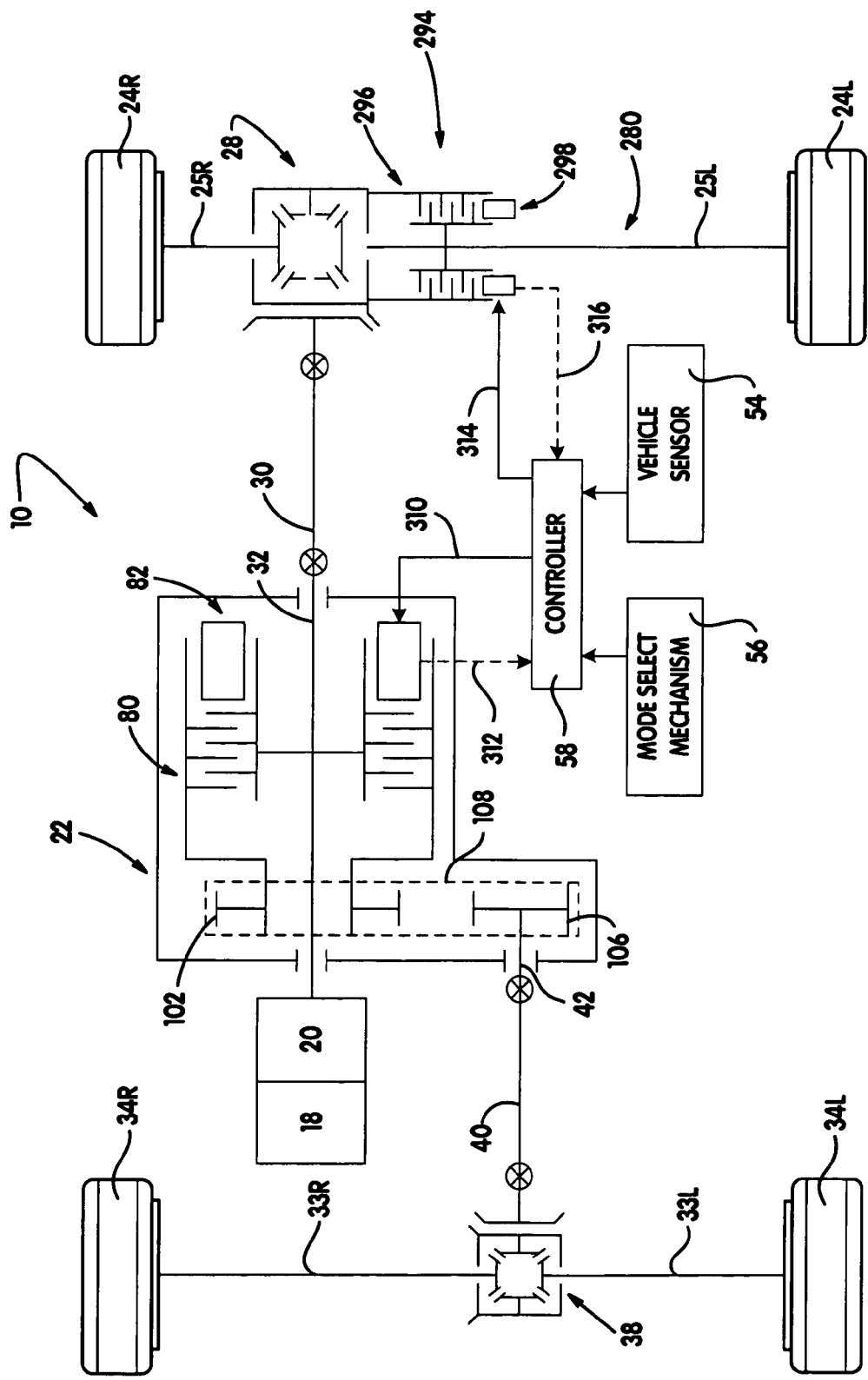
FIG. 6 is a schematic illustration of a drivetrain for a four-wheel drive vehicle incorporating a pair of torque transfer mechanisms and a power sharing traction control system.
Figure 7:
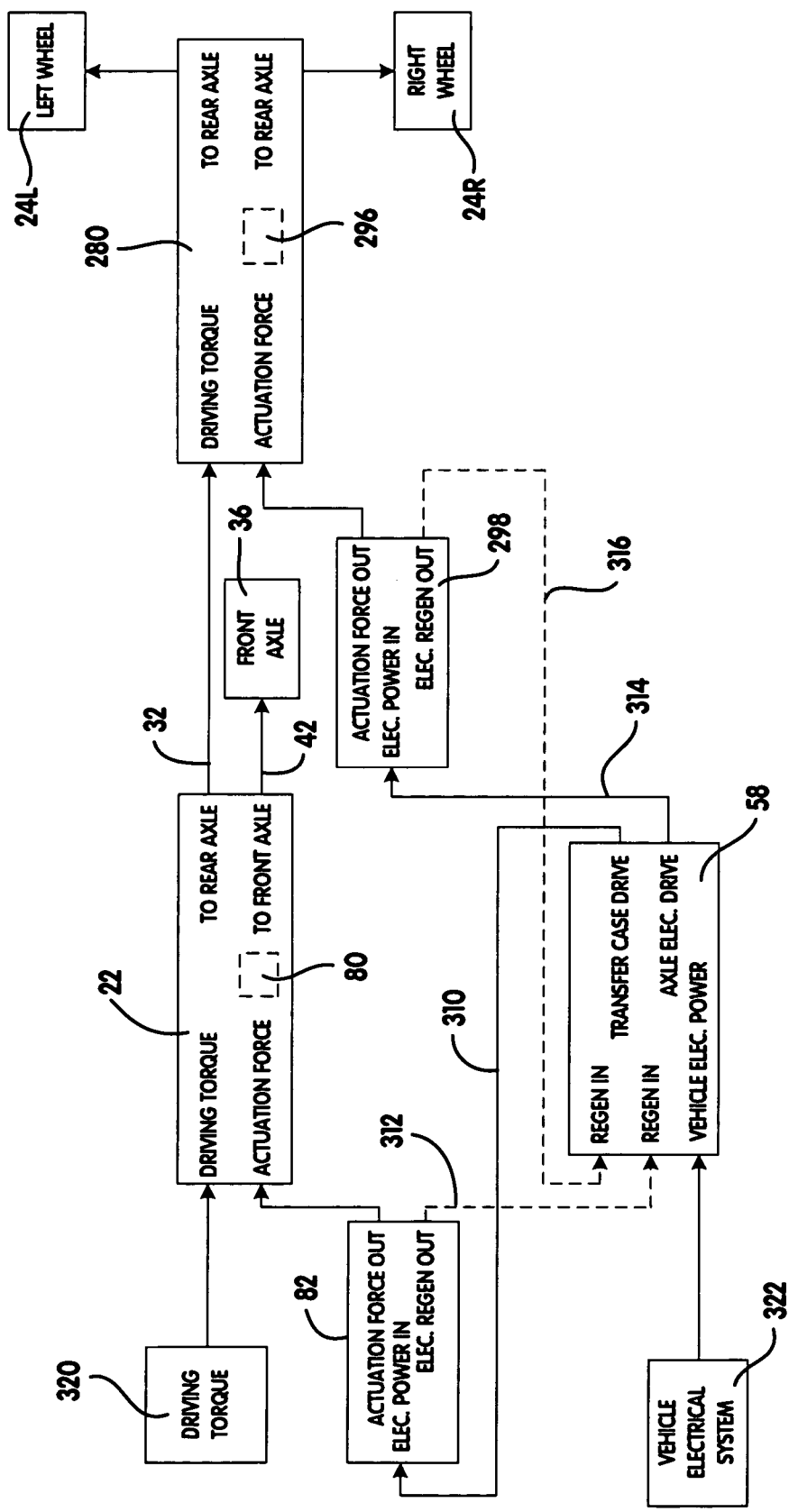
FIG. 7 is a block diagram of the electric power sharing control system for the motor vehicle shown in FIG. 6.

Drive axle assembly 280 can be used alone or in combination with other torque transfer mechanisms disclosed herein. In particular, drive axle assembly 280 can be associated with the primary axle in a rear wheel based on-demand 4WD drivetrain (FIG. 1), a front wheel based on-demand 4WD drivetrain, or in either or both drive axles in full-time 4WD drivetrains. For example, FIG. 6 is a schematic illustration of drivetrain 10 from FIG. 1 with drive axle assembly 280 used in substitution for rear axle assembly 26. Electric power to clutch actuator assembly 82 of the torque transfer coupling in transfer case 22 is shown by power line 310 while regenerated electric power from clutch actuator assembly 82 is shown by dashed line 312. Similarly, electric power flow to clutch actuator assembly 298 of torque bias coupling 294 in drive axle assembly 280 is shown by power line 314 while regenerated electric power from clutch actuator assembly 298 is shown by dashed power line 316. Referring to FIG. 7, a block diagram is provided to better illustrate the electric power system associated with the drivetrain shown in FIG. 6. Block 320 indicates the drive torque supplied to transfer case 22 by engine 18 and transmission 20 while block 322 indicates the electric power delivered to controller 58 from the vehicle's host electrical system. As noted, a unique aspect of the present invention is that power from the vehicle's host system is only required during operation of the motor/brake unit(s) in the motor mode to drive the rotor and possibly in the brake mode to energize the coil windings. However, it should be understood that the electric power regenerated from one of the clutch actuators can be used by controller 58 to provide electric power the other clutch actuator.

Figure 8:
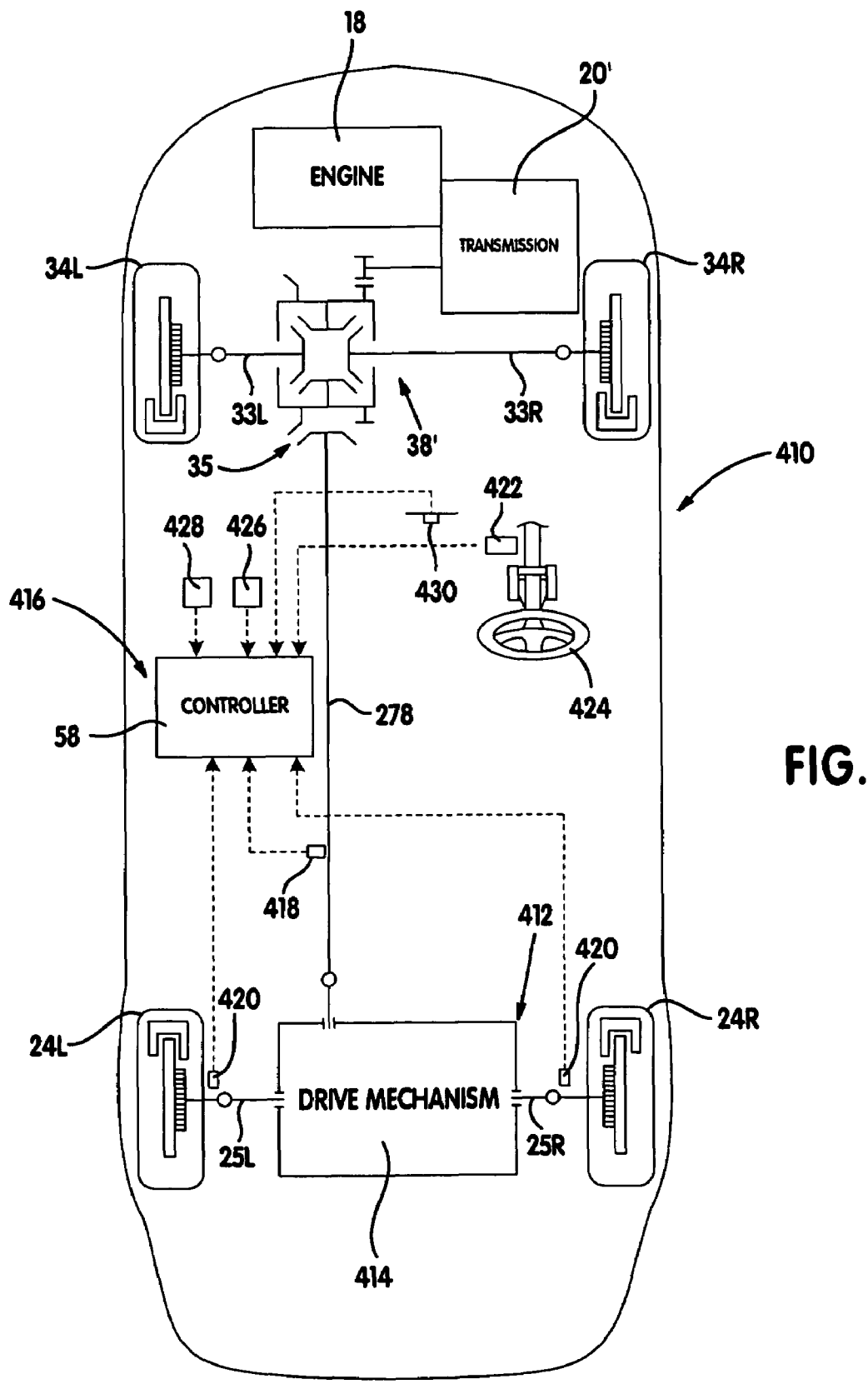
FIG. 8 is a diagrammatical illustration of an all-wheel drive motor vehicle equipped with a drive axle assembly having a torque distributing drive mechanism and an active yaw control system according to the present invention.

Referring now to FIG. 8, an all-wheel drive vehicle 410 includes engine 18 transversely mounted in a front portion of a vehicle body, a transmission 20', a front differential 38' which connects the output of transmission 20' to front axleshafts 33L and 33R and left and right front wheels 34L and 34R, a power transfer unit 35 which connects transmission 20' to a propshaft 278, and a drive axle assembly 412 having a torque distributing drive mechanism 414 which connects propshaft 278 to axleshafts 25L and 25R for driving rear wheels 24L and 24R. As will be detailed, drive mechanism 414 is operable in association with a yaw control system 416 for controlling the transmission of drive torque through axleshaft 25L and 25R to rear wheels 24L and 24R.

In addition to controller 58, yaw control system 416 includes a plurality of sensors for detecting various operational and dynamic characteristics of vehicle 410. For example, a front wheel speed sensor 418 is provided for detecting a front wheel speed value based on rotation of propshaft 278, a pair of rear wheel speed sensors 420 are operable to detect the individual rear wheel speed values based rotation of left and right axleshafts 25L and 25R, and a steering angle sensor 422 is provided to detect the steering angle of a steering wheel 424. The sensors also include a yaw rate sensor 426 for detecting a yaw rate of the body portion of vehicle 410, a lateral acceleration sensor 428 for detecting a lateral acceleration of the vehicle body, and a lock switch 430 for permitting the vehicle operator to intentionally shift drive mechanism 414 into a locked mode. As will be detailed, controller 58 controls operation of a pair of torque couplings within drive mechanism 414 by utilizing a control strategy that is based on input signals from the various sensors and lock switch 430.

Figure 9:
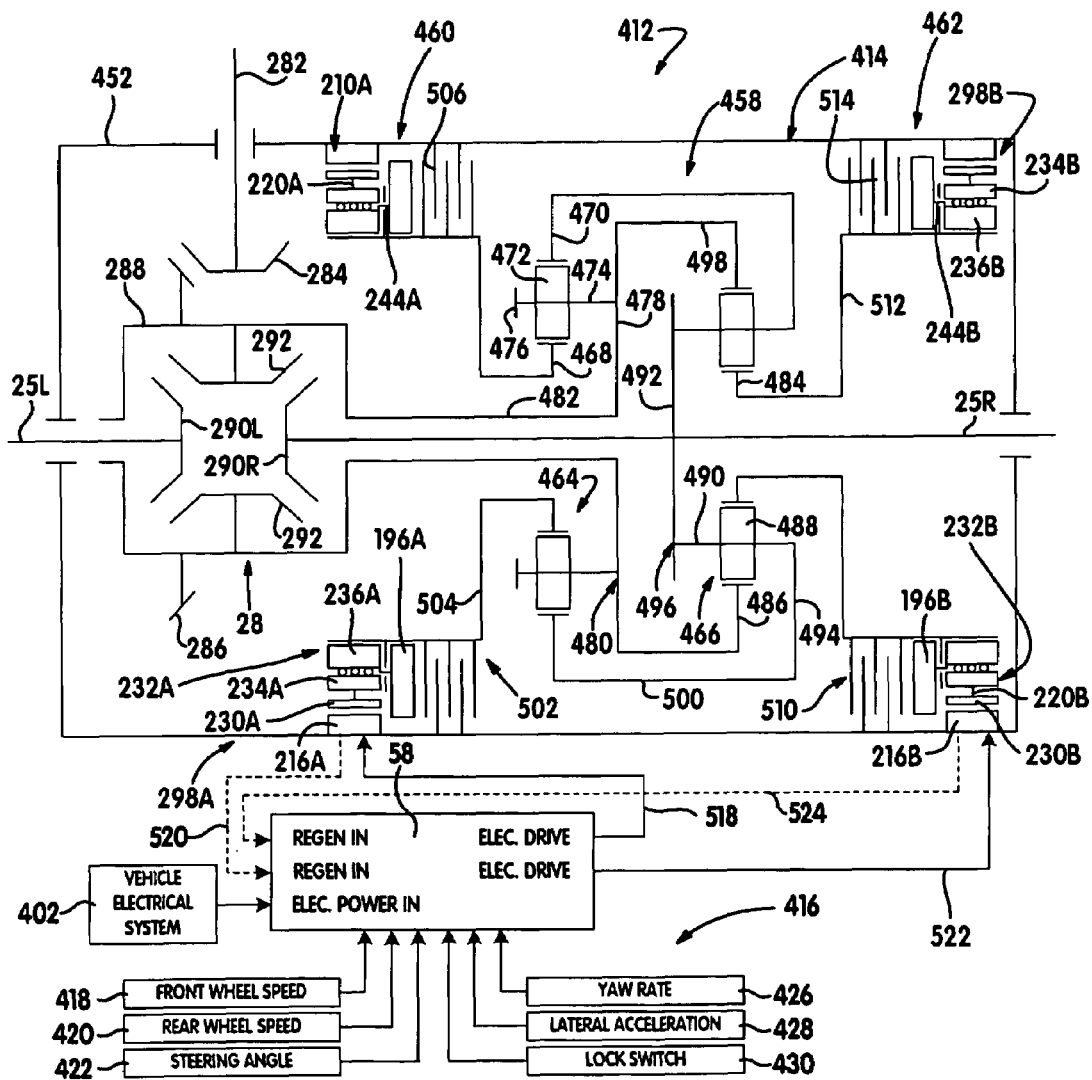
FIG. 9 is a schematic illustration of the torque distributing drive mechanism according to a first embodiment of the present invention.

As best seen from FIG. 9, rear axle assembly 412 includes an axle housing 452 within which drive mechanism 414 is supported. In general, drive mechanism 414 includes an input shaft 282, differential 28, a planetary gear assembly 458, a first or "overdrive" torque coupling 460 and a second or "underdrive" torque coupling 462. Planetary gear assembly 458 includes a first gearset 464 and a second gearset 466. First gearset 464 includes a first sun gear 468, a first ring gear 470, and a set of first planet gears 472 meshed with first sun gear 468 and first ring gear 470. Each of first planet gears 472 is rotatably supported on a post 474 extending between first and second carrier rings 476 and 478, respectively, that in combination define a first planet carrier 480. A quill shaft 482 is coaxially disposed between right axleshaft 25R and first sun gear 468 and is shown to connect second carrier ring 478 to differential carrier 288. As such, first planet carrier 480 is the input member of first gearset 464 since it is commonly driven with differential carrier 288.

Second gearset 466 includes a second sun gear 484, a second ring gear 486, and a set of second planet gears 488 meshed therewith. Each of second planet gears 488 is rotatably supported on a post 490 extending between third and fourth carrier rings 492 and 494, respectively, that in combination define a second planet carrier 496. As seen, second ring gear 486 is coupled via a first drum 498 to second carrier ring 478 for common rotation with first planet carrier 480. In addition, third carrier ring 492 is fixed for rotation with right axleshaft 25R while fourth carrier ring 494 is fixed via a second drum 500 for common rotation with first ring gear 470.

With continued reference to FIG. 9, first torque coupling 460 is shown to be operatively disposed between first sun gear 468 and axle housing 452 such that it is operable to selectively brake rotation of first sun gear 468. First torque coupling 460 is schematically shown to include a first multi-plate clutch assembly 502 and a first power-operated clutch actuator assembly 298A. Clutch assembly 502 includes a clutch hub 504 fixed for rotation with first sun gear 468 and a multi-plate clutch pack 506 disposed between hub 504 and axle housing 452. Clutch actuator 298A is generally similar in structure and function to clutch actuator 182 of FIGS. 4A and 4B and clutch actuator 298 of FIG. 5 in that it includes an electric motor/brake unit 210A and a ball screw operator 232A for controlling bi-directional movement of pressure plate 196A relative to clutch pack 506. Motor/brake unit 210A is schematically shown to include a stator 216A fixed to housing 452 and a rotor 220A having magnets 230A supported for rotation relative to stator 216A. Ball screw operator 232A has a rotary nut 234A fixed to rotor 220A and an axially moveable screw 236A for moving pressure plate 196A via linking members, such as pins 244A. Ball screw operator 232A normally rotates with hub 504 at the rotary speed of first sun gear 468. As noted, the structure and function of clutch actuator 298A is intended to be similar to that of clutch actuator 182 such that selective operation of motor/brake unit 210A in either of its motor and brake modes results in controlled relative rotation between nut 234A and screw 236A, thereby controlling axial travel of pressure plate 196A relative to clutch pack 506.

First torque coupling 460 is operable in a first or "released" mode so as to permit unrestricted rotation of first sun gear 468 relative to housing 452. In contrast, first torque coupling 460 is also operable in a second or "locked" mode for inhibiting rotation of first sun gear 468. With first sun gear 468 braked, the rotary speed of first ring gear 470 is increased which results in a corresponding increase in the rotary speed of right axleshaft 25R due to its direct connection with first ring gear 470 via second drum 500 and second planet carrier 496. Thus, right axleshaft 25R is overdriven is at a speed ratio established by the meshed gear components of first gearset 464. First torque coupling 460 is shifted between its released and locked modes via actuation of clutch actuator 298A in response to control signals from ECU 58. Specifically, first torque coupling 460 is operable in its released mode when clutch actuator 298A applies a predetermined minimum clutch engagement force on clutch pack 506 and is further operable in its locked mode when clutch actuator 298A applies a predetermined maximum clutch engagement force on clutch pack 506.

Second torque coupling 462 is shown to be operably arranged between second sun gear 484 and axle housing 452. Second torque coupling 462 is schematically shown to include a second multi-plate clutch assembly 510 and a second clutch actuator assembly 298B. Clutch assembly 510 includes a clutch hub 512 fixed for rotation with second sun gear 484 and a clutch pack 514 disposed between hub 512 and housing 452. As seen, clutch actuator assembly 298B is similar to that of clutch actuator assembly 298A such that common/similar components are identified with corresponding "A" and "B" suffixes. Specifically, clutch actuator assembly 298B includes an electric motor/brake unit 210B and a ball screw operator 232B for controlling movement of pressure plate 196B relative to clutch pack 514. Second torque coupling 462 is operable in a first or "released" mode to permit unrestricted rotation of second sun gear 484. In contrast, second torque coupling 462 is also operable in a second or "locked" mode for inhibiting rotation of second sun gear 484. With second sun gear 484 braked, the rotary speed of second planet carrier 496 is reduced which results in a corresponding speed reduction in right axleshaft 25R. Thus, right axleshaft 5R is underdriven at a speed ratio determined by the gear geometry of the meshed components of second gearset 466. Second torque coupling 462 is shifted between its released and locked modes via actuation of clutch actuator 298B in response to control signals from ECU 58. In particular, second torque coupling 462 operates in its released mode when clutch actuator 298B applies a predetermined minimum clutch engagement force on clutch pack 514 while it operates in its locked mode when clutch actuator 298B applies a predetermined maximum clutch engagement force on clutch pack 514.

In accordance with the arrangement shown, drive mechanism 414 is operable in coordination with yaw control system 416 to potentially establish at least four distinct operational modes for controlling the transfer of drive torque from input shaft 282 to axleshafts 25L and 5R. In particular, a first operational mode can be established when first torque coupling 460 and second torque coupling 462 are both in their released mode such that differential 28 acts as an "open" differential so as to permit unrestricted speed differentiation with drive torque transmitted from differential carrier 288 to axleshafts 25L and 25R based on the tractive conditions at each corresponding rear wheels 24L and 24R. A second operational mode can be established when both first torque coupling 460 and second torque coupling 462 are in their locked mode such that differential 28 acts as a "locked" differential with no speed differentiation permitted between rear axleshafts 25L and 25R. This mode can be intentionally selected via actuation of lock switch 430 when vehicle 410 is being operated off-road or on poor roads.

A third operational mode can be established when first torque coupling 460 is shifted into its locked mode while second torque coupling 462 is operable in its released mode. With first sun gear 468 held against rotation, rotation of first planet carrier 480 due to driven rotation of differential carrier 288 causes first ring gear 470 to be driven at an increased speed relative to differential carrier 288. As a result, right axleshaft 25R is overdriven at the same increased speed of first ring gear 470 due to its connection thereto via second drum 500 and second planet carrier 496. Such an increase in speed in right axleshaft 25R causes a corresponding speed reduction in left axleshaft 25L. Thus, left axleshaft 25L is underdriven while right axleshaft 25R is overdriven to accommodate the current tractive or steering condition detected and/or anticipated by ECU 58 based on the particular control strategy used.

A fourth operational mode can be established when first torque coupling 460 is shifted into its released mode and torque coupling 462 is shifted into its locked mode. With second sun gear 484 held against rotation and second ring gear 486 driven at a common speed with differential carrier 288, second planet carrier 496 is driven at a reduced speed. As a result, right rear axleshaft 25R is underdriven relative to differential carrier 288 which, in turn, causes left axleshaft 25L to be overdriven at a corresponding increased speed. Thus, left axleshaft 25L is overdriven while right axleshaft 25R is underdriven to accommodate the current tractive or steering conditions detected and/or anticipated by ECU 58.

In addition to on-off control of the torque couplings to establish the various drive modes associated with overdrive and underdrive connections through speed changing unit 458, it is further contemplated that variable clutch engagement forces can be generated by power-operated actuators 298A and 298B to adaptively regulate the left-to-right speed and torque characteristics. This "adaptive" control feature functions to provide enhanced yaw and stability control for vehicle 410. For example, a reference yaw rate can be determined based on several factors including the steering angle detected by steering angle sensor 422, the vehicle speed as calculated based on signals from the various speed sensors, and a lateral acceleration as detected by lateral acceleration sensor 428. Controller 58 compares this reference yaw rate with an actual yaw rate value detected by yaw sensor 426. This comparison will determine whether vehicle 410 is in an understeer or an oversteer condition so as to permit yaw control system 416 to be adaptively control actuation of the couplings to accommodate these types of steering tendencies. Controller 58 can address such conditions by shifting drive mechanism 414 into the specific operative drive mode that is best suited to correct the actual or anticipated oversteer or understeer situation. Optionally, variable control of the couplings also permits adaptive regulation of the side-to-side torque transfer and speed differentiation characteristics if one of the distinct drive modes is not adequate to accommodate the current steer tractive condition. In accordance with the power sharing feature of this invention, electric power supplied to motor/brake unit 210A of first torque coupling 460 is shown by power line 518 while electric power regenerated from motor/brake unit 210A is shown by dashed line 520. Similarly, electric power supplied to electric motor/brake unit 210B of second torque coupling 462 is shown by power line 522 while its regenerated power is shown by dashed line 524.

Figure 10:
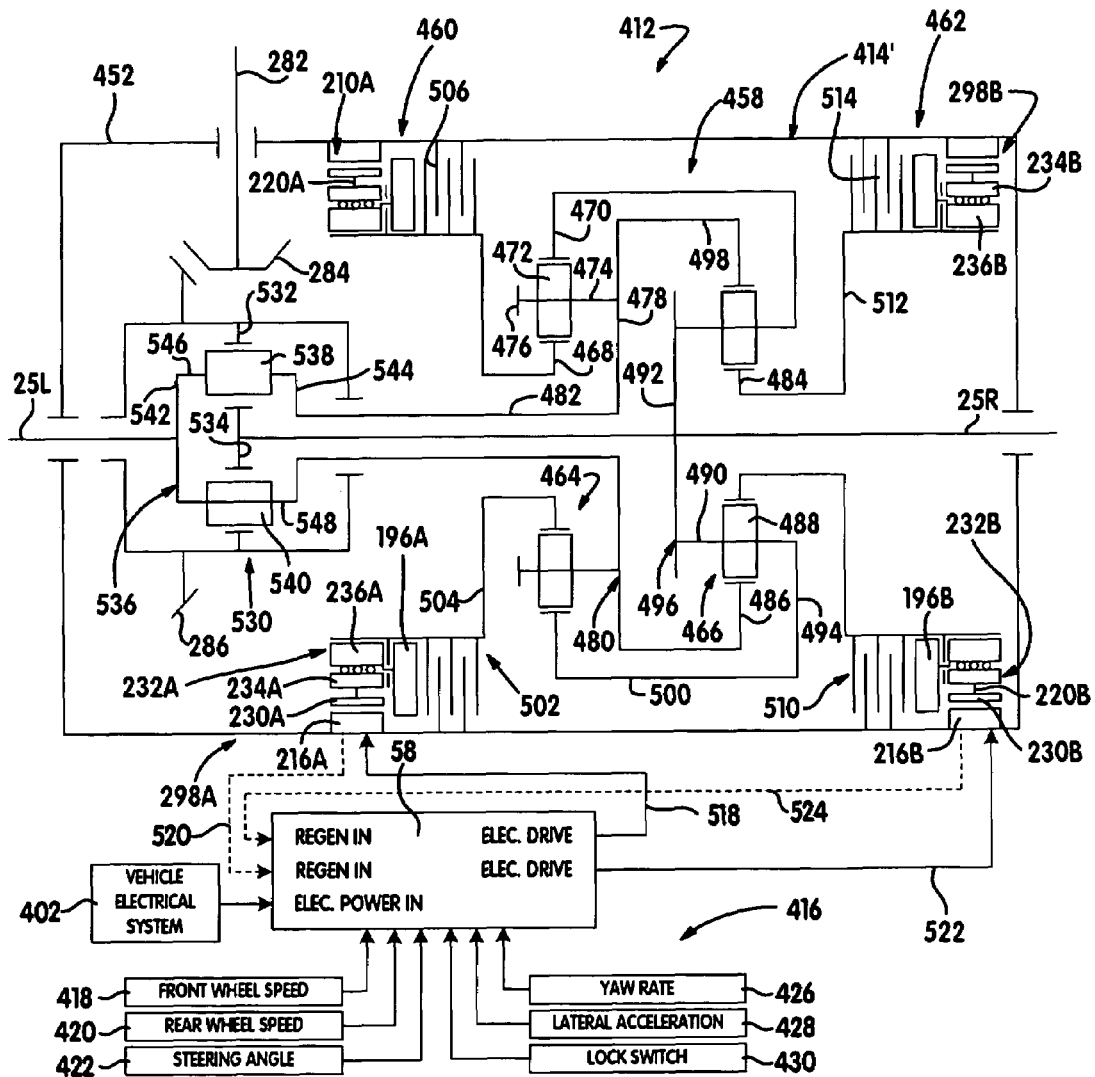
FIG. 10 is a schematic illustration of a second embodiment of the torque distributing drive mechanism of the present invention.

Referring now to FIG. 10, an alternative embodiment of drive mechanism 414 is shown and designated by reference numeral 414'. Generally speaking, a large number of components are common to both drive mechanism 414 and 414', with such components being identified by the same reference numbers. However, drive mechanism 414' is shown to include a modified differential assembly 530 of the planetary type having a ring gear 532 driven by hypoid ring gear 286 so as to act as its input component. Differential 530 further includes a sun gear 534 fixed for common rotation with right axleshaft 25R, a differential carrier 536 fixed for common rotation with left axleshaft 25L, and meshed sets of first pinions 538 and second pinions 540. Planet carrier 536 includes a first carrier ring 542 fixed to left axleshaft 25L, a second carrier ring 544 fixed to quill shaft 482, a set of first pins 546 extending between the carrier rings and on which first pinions 538 are rotatably supported, and a set of second pins 548 also extending between the carrier rings and rotatably supporting second pinions 540 thereon. First pinions 538 are meshed with sun gear 534 while second pinions 540 are meshed with ring gear 532. As seen, quill shaft 482 connects differential carrier 536 for common rotation with planet carrier 480 of first gearset 464.

Drive mechanism 414' is similar in operation to drive mechanism 414 in that first torque coupling 460 functions to cause right axleshaft 25R to be overdriven while second transfer coupling 462 functions to cause right axleshaft 25R to be underdriven. As such, the four distinct operational modes previously described are again available and can be established by drive mechanism 414' via selective actuation of power-operated clutch actuators 298A and 298B.

Figure 11:
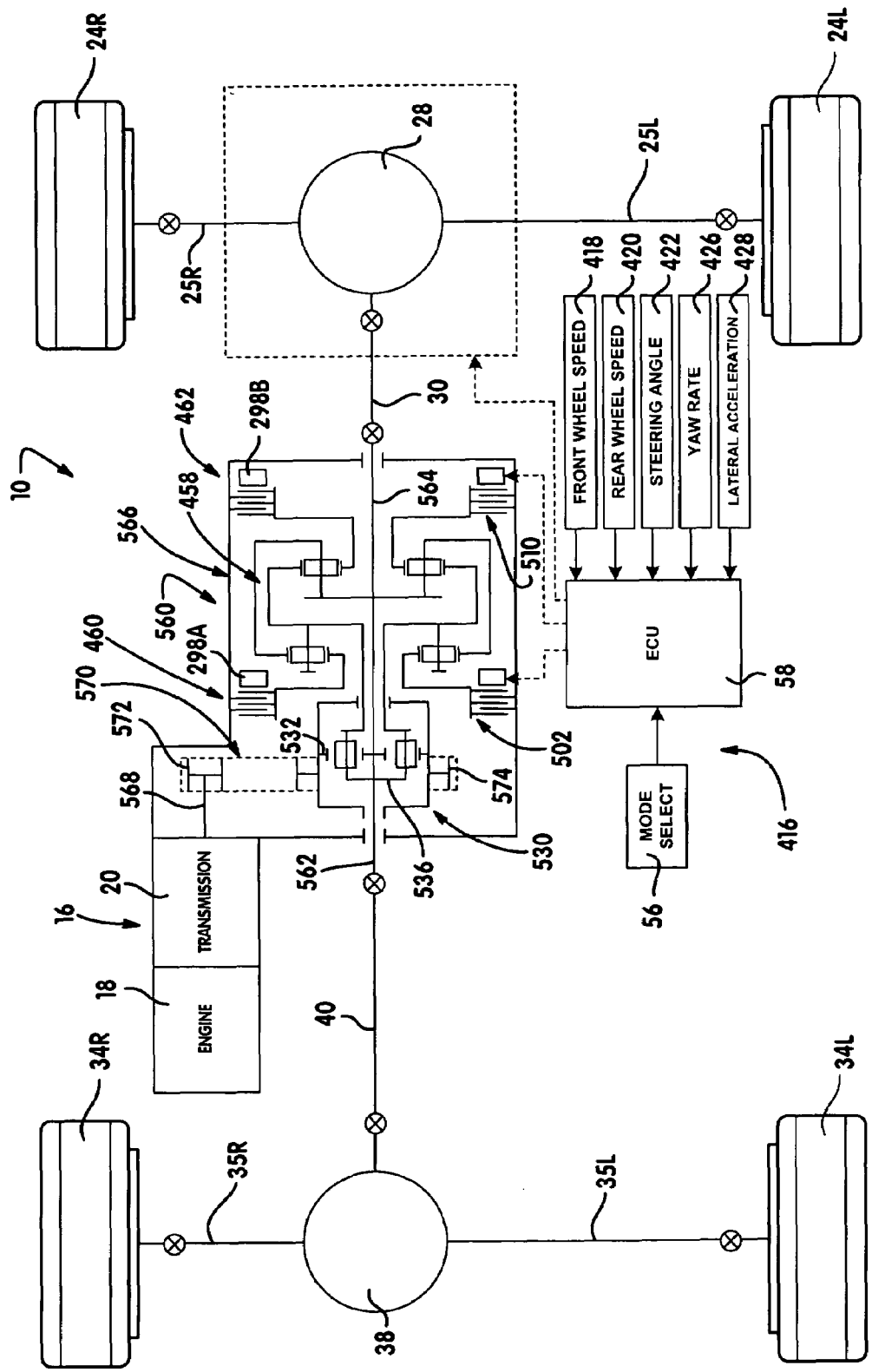
FIG. 11 is an illustration of the torque distributing drive mechanism of FIG. 10 now installed in a transfer case for use in four-wheel drive vehicles.

Referring now to FIG. 11, a four-wheel drive vehicle 10 is shown with a power transfer unit 560 operable for transferring drive torque from the output of transmission 20 to a first or front output shaft 562 and a second or rear output shaft 564. Front output shaft 562 drives front propshaft 40 which, in turn, drives front differential 38 for driving front wheels 34L and 34R. Likewise, rear output shaft 564 drives rear propshaft 30 which, in turn, drives rear differential 28 for driving rear wheels 24L and 24R. Power transfer unit 560, otherwise known as a transfer case, includes a torque distribution mechanism 566 which functions to transmit drive torque from its input shaft 568 to both of output shafts 562 and 564 so as to bias the torque distribution ratio therebetween, thereby controlling the tractive operation of vehicle 10. As seen, torque distribution mechanism 566 is operably associated with traction control system 416 for providing this adaptive traction control feature.

Torque distribution mechanism 566 of power transfer unit 560 is shown to be generally similar in structure to drive mechanism 414' of FIG. 10 with the exception that ring gear 532 is now drivingly connected to input shaft 568 via a transfer assembly 570. In the arrangement shown, transfer assembly 570 includes a first sprocket 572 driven by input shaft 568, a second sprocket 574 driving ring gear 532, and a power chain 576 therebetween. As seen, front output shaft 562 is driven by differential carrier 536 of differential unit 530 which now acts as a center or "interaxle" differential for permitting speed differentiation between the front and rear output shafts. In addition, sun gear 534 of differential unit 53 drives rear output shaft 564. Also, planet carrier 496 of second gearset 466 is coupled to rear output shaft 564.

Control over actuation of torque couplings 460 and 462 in transfer case 560 results in corresponding increases or decreases in the rotary speed of rear output shaft 564 relative to front output shaft 568, thereby controlling the amount of drive torque transmitted therebetween. In particular, with both torque couplings released, unrestricted speed differentiation is permitted between the output shafts while the gear ratio established by the components of interaxle differential unit 530 controls the front-to-rear torque ratio based on the current tractive conditions of the front and rear wheels. In contrast, with both torque couplings engaged, a locked four-wheel drive mode is established wherein no interaxle speed differentiation is permitted between the front and rear output shafts. Such a drive mode can be intentionally selected via mode switch 56 when vehicle 10 is driven off-road or during severe road conditions. An adaptive four-wheel drive mode is made available under control of traction control system 416 to vary the front-rear drive torque distribution ratio based on the tractive needs of the front and rear wheels as detected by the various sensors. In addition to power transfer unit 560, vehicle 10 could also be equipped with rear axle assembly 26 of FIG. 1, limited slip rear axle assembly 280 of FIG. 5 or torque vectoring drive axle assembly 416 of FIG. 9 or 10.

Figure 12:
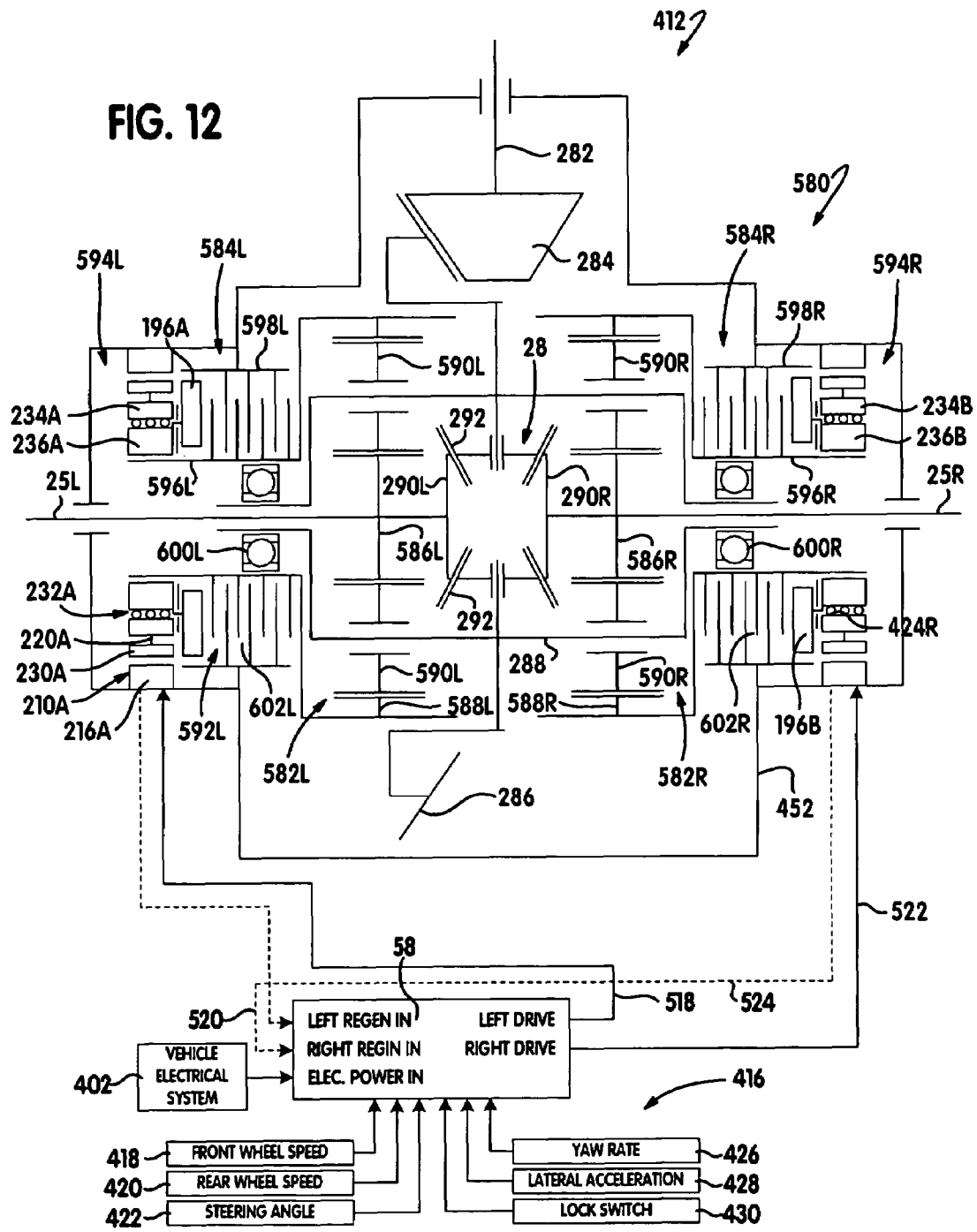
FIGS. 12 through 17 are schematic illustrations of additional alternative embodiments of the torque distributing drive mechanism of the present invention.

Referring now to FIG. 12, another embodiment of a drive mechanism 580 for use in drive axle assembly 412 is disclosed. In general, torque distributing drive mechanism 580 includes input shaft 282, differential 28, a first or left speed changing unit 582L, a second or right speed changing unit 582R, a first or left torque coupling 584L and a second or right torque coupling 584R. As before, input shaft 282 includes a pinion gear 284 that is in constant mesh with a hypoid ring gear 286. Ring gear 286 is fixed for rotation with carrier 288 associated with differential 28. Differential 28 is operable to transfer drive torque from carrier 280 to axleshafts 25L and 25R while permitting speed differentiation therebetween. Differential 28 includes left side gear 290L fixed for rotation with left axleshaft 25L, right side gear 290R fixed for rotation with right axleshaft 25R, and at least one pair of pinion gears 292 rotatably supported on pinion shafts that are fixed for rotation with carrier 288.

Left speed changing unit 582L is a planetary gearset having a sun gear 586L fixed for rotation with left axleshaft 25L, a ring gear 588L, and a plurality of planet gears 590L rotatably supported by carrier 288 and which are meshed with both sun gear 586L and ring gear 588L. Right speed changing unit 582R is generally identical to left speed changing unit 582L and is shown to include a sun gear 586R fixed for rotation with right axleshaft 25R, a ring gear 588R, and a plurality of planet gears 590R rotatably supported by carrier 288 and meshed with both sun gear 586R and ring gear 588R.

With continued reference to FIG. 12, first torque coupling 584L is shown to be operably disposed between ring gear 588L of first speed changing unit 582L and housing 452. First torque coupling 584L includes a first multi-plate clutch assembly 592L and a first clutch actuator assembly 594L which is contemplated to be similar in structure to clutch actuator assembly 298A. Clutch assembly 592L includes a clutch hub 596L that is connected for common rotation with ring gear 588L and a drum 598L that is non-rotatably fixed to housing 452. As seen, a bearing assembly 600L supports hub 596L for rotation relative to carrier 288. In addition, a multi-plate clutch pack 602L is operably disposed between drum 598L and hub 596L. Clutch actuator 594L is shown to include electric motor/brake unit 210A and ball screw operator 232A for controlling movement of pressure plate 196A relative to clutch pack 602L.

First torque coupling 584L is operable in a first or "released" mode so as to permit unrestricted rotation of ring gear 588L. In contrast, first torque coupling 584L is also operable in a second or "locked" mode to brake rotation of ring gear 588L, thereby causing sun gear 586L to be driven at an increased rotary speed relative to carrier 288. Thus, first torque coupling 584L functions in its locked mode to increase the rotary speed of left axleshaft 25L which, in turn, causes differential 28 to generate a corresponding decrease in the rotary speed of right axleshaft 25R, thereby directing more drive torque to left axleshaft 25L than is transmitted to right axleshaft 25R. Specifically, an increase in the rotary speed of left axleshaft 25L caused by speed changing gearset 582L causes a corresponding increase in the rotary speed of first side gear 290L which, in turn, causes pinions 292 to drive right side gear 290R at a corresponding reduced speed. First torque coupling 584L is shifted between its released and locked modes via actuation of power-operated clutch actuator 594L in response to control signals from ECU 58.

Second torque coupling 584L is shown to be operably disposed between ring gear 588R of second speed changing unit 582R and housing 452. Second torque coupling 584R includes a second multi-plate clutch assembly 592R and a second clutch actuator assembly 594R. In particular, clutch assembly 592R includes a clutch hub 596R that is fixed for rotation with ring gear 588R, a drum 598R non-rotatably fixed to housing 452, and a multi-plate clutch pack 502R operably disposed between hub 596R and drum 598R. Second clutch actuator 594R is also schematically shown to include components similar to clutch actuator 298B. Second torque coupling 584R is operable in a first or "released" mode so as to permit unrestricted relative rotation of ring gear 588R. In contrast, second torque coupling 584R is also operable in a second or "locked" mode to brake rotation of ring gear 588R, thereby causing the rotary speed of sun gear 586R to be increased relative to carrier 288. Thus, second torque coupling 584R functions in its locked mode to increase the rotary speed of right axleshaft 25R which, in turn, causes differential 28 to decrease the rotary speed of left axleshaft 25L, thereby directing more drive torque to right axleshaft 25R than is directed to left axleshaft 25L. Second torque coupling 584R is shifted between its released and locked modes via actuation of clutch actuator 594R in response to control signals from ECU 58.

In accordance with the arrangement shown, torque distributing drive mechanism 580 is operable in coordination with yaw control system 416 to establish at least three distinct operational modes for controlling the transfer of drive torque from input shaft 282 to axleshafts 25L and 25R. In particular, a first operational mode is established when first torque coupling 584L and second torque coupling 584R are both in their released mode such that differential 28 acts as an "open" differential so as to permit unrestricted speed differentiation with drive torque transmitted from carrier 288 to each axleshaft 25L and 25R based on the tractive conditions at each corresponding rear wheel 24L and 24R. A second operational mode is established when first torque coupling 584L is in its locked mode while second torque coupling 584R is in its released mode. As a result, left axleshaft 25L is overdriven by first speed changing unit 582L due to the braking of ring gear 588L. As noted, such an increase in the rotary speed of left axleshaft 25L causes a corresponding speed decrease in right axleshaft 25R. Thus, this second operational mode causes right axleshaft 25R to be underdriven while left axleshaft 25L is overdriven when such an unequal torque distribution is required to accommodate the current tractive or steering condition detected and/or anticipated by ECU 58 and based on the particular control strategy used. A third operational mode is established when first torque coupling 584L is shifted into its released mode and second torque coupling 584R is shifted into its locked mode. As a result, right axleshaft 25R is overdriven relative to carrier 288 by second speed changing unit 582R which, in turn, causes left axleshaft 25L to be underdriven by differential 28 at a corresponding reduced speed. Accordingly, drive mechanism 580 can be controlled to function as both a limited slip differential and a torque vectoring device.

Figure 13:
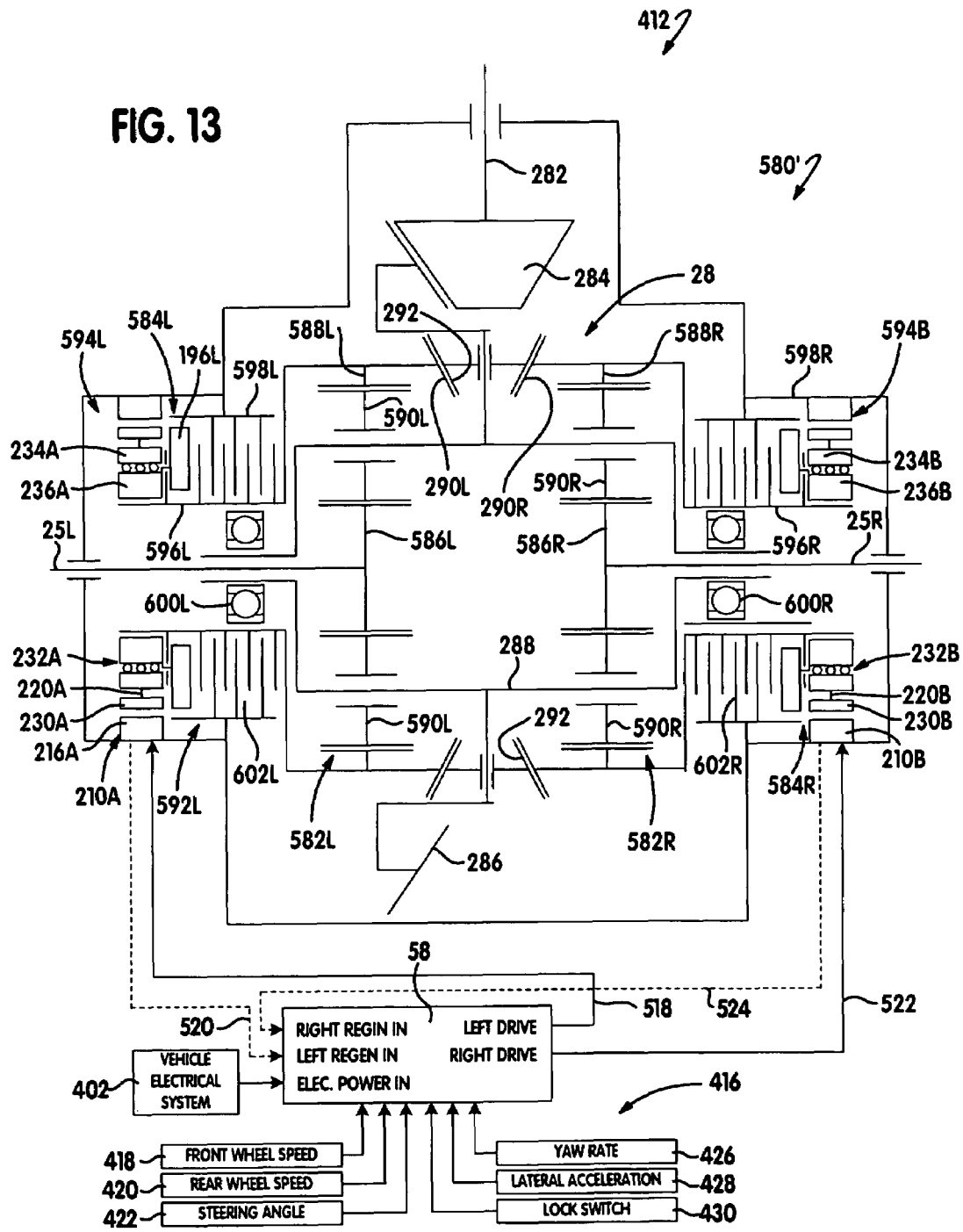

Referring now to FIG. 13, a modified version of drive mechanism 580 from FIG. 12 is shown and hereinafter referred to as drive mechanism 580'. Again, common components are identified with the same reference numerals. In this embodiment, however, differential 28 has been moved outboard of carrier 288 rather than the inboard arrangement shown in FIG. 12. To accomplish this, left side gear 290L is now shown to be fixed for rotation with ring gear 580L while right side gear 290R is shown to be fixed for rotation with ring gear 588R. Pinions 292 are still rotatably mounted on pinion shafts that couple ring gear 286 to carrier 288. Drive mechanism 580' also works in conjunction with yaw control system 416 to establish the three distinct operational modes. As before, with both torque couplings released, differential 28 acts as an open differential with side gears 290L and 290R driving corresponding ring gears 588L and 588R which, in turn, transfers drive torque to axleshafts 25L and 25R through speed changing gearsets 582L and 582R, respectively. Drive mechanism 580' is also operable when first torque coupling 584L is locked and second torque coupling 584R is released to have first gearset 582L overdrive left axleshaft 25L relative to carrier 288. Specifically, with ring gear 588L braked, left side gear 290L is likewise braked such that pinions 292 cause right side gear 290R to be rotated at an increased speed. This increased rotary speed of side gear 290R causes corresponding rotation of ring gear 588R which, in turn, causes sun gear 586R to drive right axleshaft 25R at a reduced speed. In contrast, when first torque coupling 584L is released and second torque coupling 584R is locked, second gearset 582R overdrives right axleshaft 25R due to braking of ring gear 588R. In addition, the concurrent braking of side gear 290R causes a corresponding increase in rotary speed of ring gear 588L so as to reduce the rotary speed of sun gear 586L and left axleshaft 25L.

Figure 14:
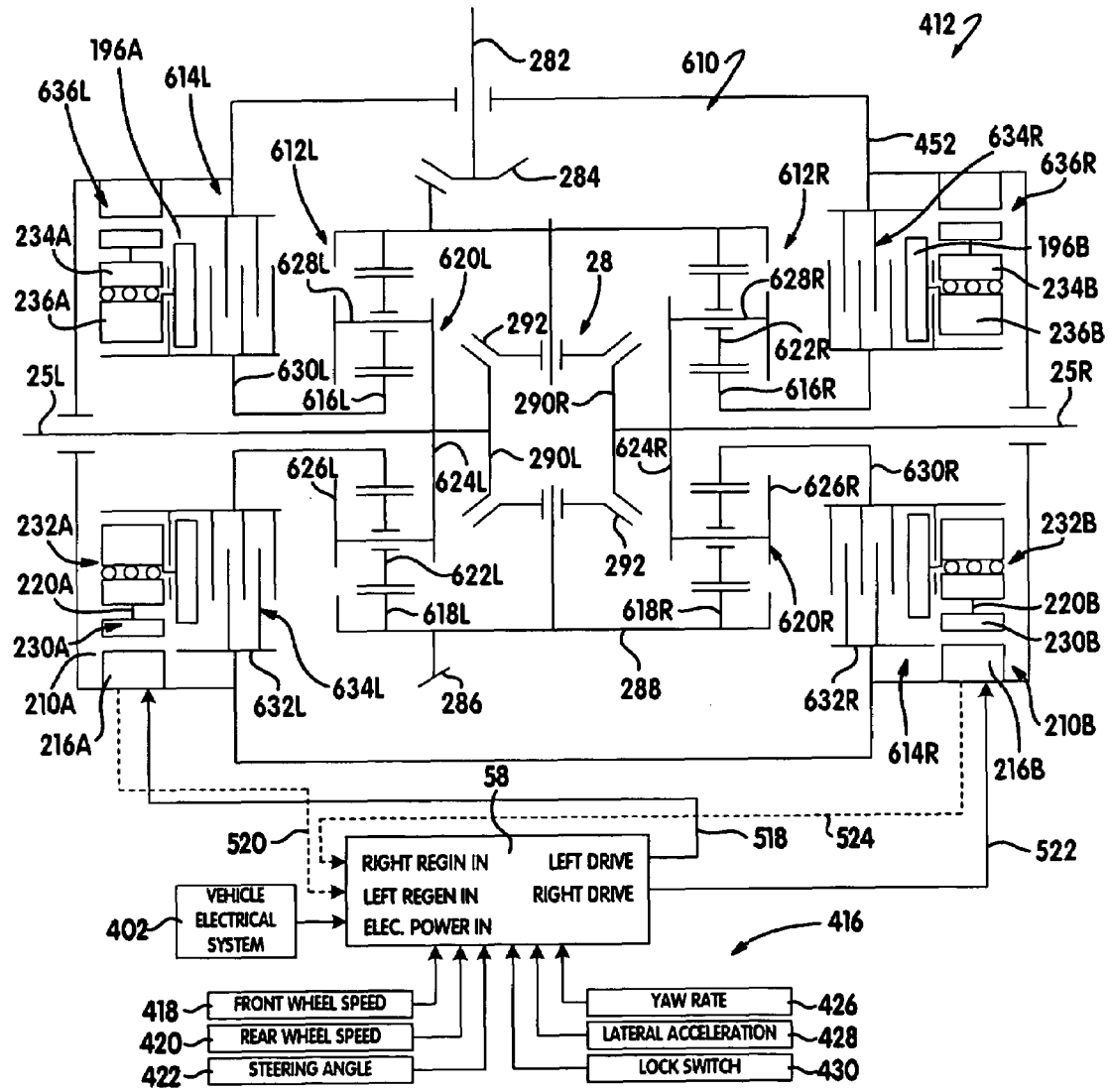

Referring now to FIG. 14, rear axle assembly 412 is shown to include a drive mechanism 610. In general, torque distributing drive mechanism 610 includes input shaft 282, differential 28, a first or left speed changing unit 612L, a second or right speed changing unit 612R, a first or left torque coupling 614L and a second or right torque coupling 614R. Left speed changing unit 612L is a planetary gearset having a sun gear 616L supported for rotation relative to left axleshaft 25L, a ring gear 618L fixed for rotation with differential carrier 288, a planet carrier 620L fixed for rotation with left axleshaft 25L, and a plurality of planet gears 622L rotatably supported on planet carrier 620L and which are meshed with both sun gear 616L and ring gear 618L. As seen, planet carrier 620L includes a first carrier ring 624L that is fixed to axleshaft 25L, a second carrier ring 626L and pins 628L therebetween on which planet gears 622L are rotatably supported. Right speed changing unit 612R is generally identical to left speed changing unit 612L and is shown to include a sun gear 616R supported for rotation relative to right axleshaft 25R, a ring gear 618R fixed for rotation with differential carrier 288, a planet carrier 620R fixed for rotation with right axleshaft 25R, and a plurality of planet gears 622R rotatably supported on planet carrier 620R and which are meshed with both sun gear 616R and ring gear 618R. Planet carrier 620R also includes a first carrier ring 624R that is fixed to axleshaft 25R, a second carrier ring 626R and pins 628R therebetween on which planet gears 622R are rotatably supported.

With continued reference to FIG. 14, first torque coupling 614L is shown to be operably disposed between sun gear 616L of first speed changing unit 612L and housing 452. In particular, first torque coupling 614L includes a clutch hub 630L that is connected for common rotation with sun gear 616L and a drum 632L that is non-rotatably fixed to housing 452. First torque coupling 614L also includes a first multi-plate clutch pack 634L that is operably disposed between drum 632L and hub 630L and a first power-operated clutch operator 636L. Clutch actuator 636L is generally similar to clutch actuator 298A and is schematically shown to include common components. First torque coupling 614L is operable in a first or "released" mode so as to permit unrestricted rotation of sun gear 616L. In contrast, first torque coupling 614L is also operable in a second or "locked" mode to brake rotation of sun gear 616L, thereby causing planet carrier 620L to be driven at a reduced rotary speed relative to differential carrier 288. Thus, first torque coupling 614L functions in its locked mode to decrease the rotary speed of left axleshaft 25L which, in turn, causes differential 28 to generate a corresponding increase in the rotary speed of right axleshaft 25R, thereby directing more drive torque to right axleshaft 25R than is transmitted to left axleshaft 25L. Specifically, the reduced rotary speed of left axleshaft 25L caused by engagement of speed changing gearset 612L causes a corresponding decrease in the rotary speed of left side gear 290L which, in turn, causes pinions 292 to drive right side gear 290R and right axleshaft 25R at a corresponding increased speed. First torque coupling 614L is shifted between its released and locked modes via actuation of power-operated clutch actuator 636L in response to control signals from ECU 58.

Second torque coupling 614R is shown to be operably disposed between sun gear 616R of second speed changing unit 612R and housing 452. In particular, second torque coupling 614R includes a clutch hub 630R that is fixed for rotation with sun gear 616R, a drum 632R non-rotatably fixed to housing 452, a second multi-plate clutch pack 634R operably disposed between hub 630R and drum 632R and second clutch actuator assembly 636R. Second torque coupling 614R is operable in a first or "released" mode so as to permit unrestricted relative rotation of sun gear 616R. In contrast, second torque coupling 614R is also operable in a second or "locked" mode to brake rotation of sun gear 616R, thereby causing the rotary speed of planet carrier 620R to be decreased relative to differential carrier 288. Thus, second torque coupling 614R functions in its locked mode to decrease the rotary speed of right axleshaft 25R which, in turn, causes differential 28 to increase the rotary speed of left axleshaft 25L, thereby directing more drive torque to left axleshaft 25L than is directed to right axleshaft 25R. Second torque coupling 614R is shifted between its released and locked modes via actuation of power-operated clutch actuator 636R in response to control signals from ECU 58.

In accordance with the arrangement shown, torque distributing drive mechanism 610 is operable in coordination with yaw control system 416 to establish at a least three distinct operational modes for controlling the transfer of drive torque from input shaft 282 to axleshafts 25L and 25R. In particular, a first operational mode is established when first torque coupling 614L and second torque coupling 614R are both in their released mode such that differential 28 acts as an "open". A second operational mode is established when first torque coupling 614L is in its locked mode while second torque coupling 614R is in its released mode. As a result, left axleshaft 25L is underdriven by first speed changing unit 612L due to braking of sun gear 616L. As noted, such a decrease in the rotary speed of left axleshaft 25L causes a corresponding speed increase in right axleshaft 25R. Thus, this second operational mode causes right axleshaft 25R to be overdriven while left axleshaft 25L is underdriven whenever such an unequal torque distribution is required to accommodate the current tractive or steering condition detected and/or anticipated by ECU 58. Likewise, a third operational mode is established when first torque coupling 614L is shifted into its released mode and second torque coupling 614R is shifted into its locked mode. As a result, right axleshaft 25R is underdriven relative to differential carrier 288 by second speed changing unit 612R which, in turn, causes left axleshaft 25L to be overdriven at a corresponding increased speed. Accordingly, drive mechanism 610 can be controlled to function as both a limited slip differential and a torque vectoring device.

Figure 15:
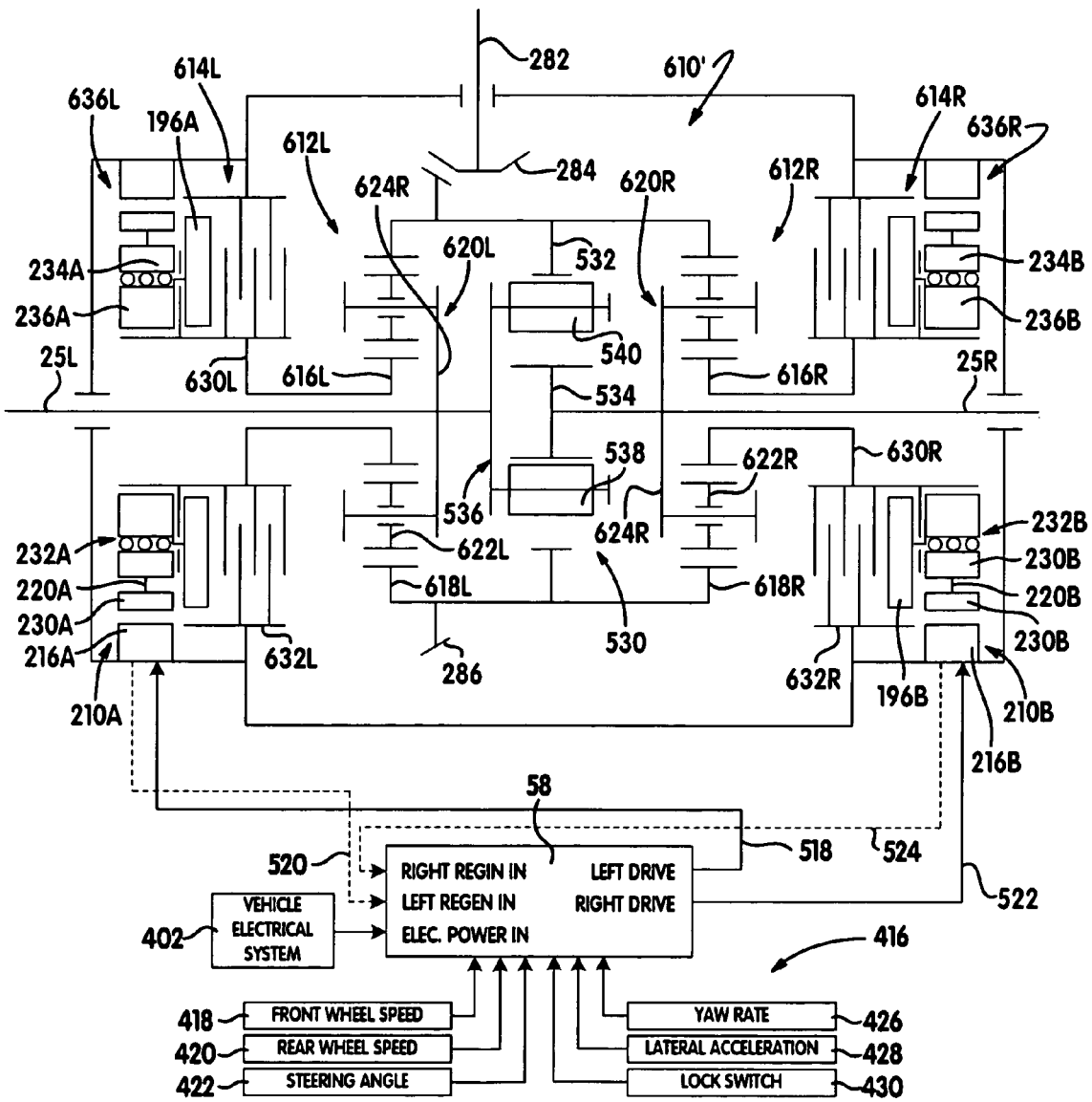

Referring now to FIG. 15, a modified version of drive mechanism 610 is shown and hereinafter referred to as drive mechanism 610'. Again, common reference numbers are used to identify similar components. In this embodiment, however, bevel differential 28 has been replaced with planetary differential 530. As such, planet carrier 536 is fixed to left axleshaft 25L while sun gear 534 is fixed to right axleshaft 25R.

Figure 16:
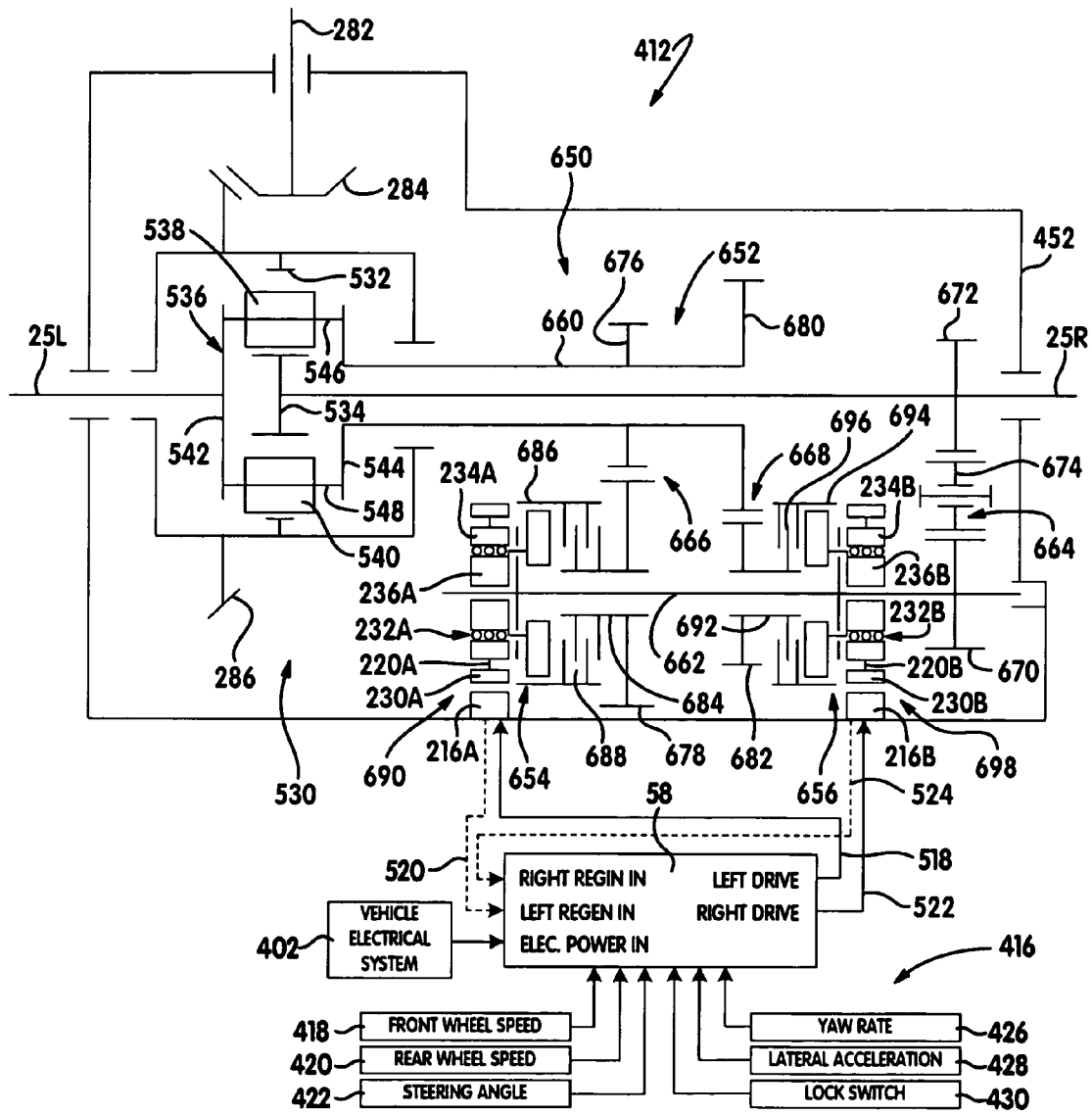

Referring now to FIG. 16, rear axle assembly 412 includes an axle housing 452 within which drive mechanism 650 is rotatably supported. In general, torque distributing drive mechanism 650 includes input shaft 282, differential 530, a speed changing unit 652, a first torque coupling 654 and a second torque coupling 656. Speed changing unit 652 includes a first transfer shaft 660 driven by differential carrier 536 for common rotation with left axleshaft 25L, a second transfer shaft 662 operably connected for rotation with right axleshaft 25R via a transfer unit 664, a first constant-mesh gearset 666 and a second constant-mesh gearset 668. Transfer unit 664 includes a first transfer gear 670 coupled for rotation with second transfer shaft 662, a second transfer gear 672 coupled for rotation with right axleshaft 25R, and an idler gear 674 meshed with both of first transfer gear 670 and second transfer gear 672. First gearset 666 includes a first drive gear 676 that is fixed to first transfer shaft 660 and meshed with a first speed gear 678 that is rotatably supported on second transfer shaft 662. In essence, first gearset 666 is a speed reducing or "underdrive" gearset which functions to cause first speed gear 678 to be rotatably driven at a slower rotary speed than first transfer shaft 660. Likewise, second gearset 668 includes a second drive gear 680 that is fixed to first transfer shaft 660 and meshed with a second speed gear 682 that is rotatably supported on second transfer shaft 662. In contrast to first gearset 666, second gearset 668 is a speed increasing or "overdrive" gearset which functions to cause second speed gear 682 to be driven at a faster rotary speed than first transfer shaft 660.

With continued reference to FIG. 16, first torque coupling 654 is shown to be operably disposed between first speed gear 678 of first gearset 666 and second transfer shaft 662. In particular, first torque coupling 654 includes a clutch hub 684 that is connected to first speed gear 678 and a drum 686 that is fixed for rotation with second transfer shaft 662. First torque coupling 654 also includes a multi-plate clutch pack 688 that is operably disposed between drum 686 and hub 684, and a power-operated clutch actuator 690. Clutch actuator 690 is shown to include similar components to those previously disclosed including an electric motor/brake unit 210A and a ball screw operator 232A. First torque coupling 654 is operable in a first or "released" mode so as to permit unrestricted rotation of second transfer shaft 662 relative to first transfer shaft 660. In contrast, first torque coupling 654 is also operable in a second or "locked" mode to couple first speed gear 678 to second transfer shaft 662, thereby driving second transfer shaft 662 at a reduced speed relative to first transfer shaft 660. Thus, first torque coupling 654 functions in its locked mode to decrease the rotary speed of right axleshaft 25R which, in turn, causes differential 540 to generate a corresponding increase in the rotary speed of left axleshaft 25L, thereby directing more drive torque to left axleshaft 25L than is transmitted to right axleshaft 25R. First torque coupling 654 is shifted between its released and locked modes via actuation of power-operated clutch actuator 690 in response to control signals from ECU 58.

Second torque coupling 656 is shown to be operably disposed between second speed gear 682 of second gearset 668 and second transfer shaft 662. In particular, second torque coupling 656 includes a clutch hub 692 that is fixed for rotation with second speed gear 682, a drum 694 fixed for rotation with second transfer shaft 662, a multi-plate clutch pack 696 operably disposed between hub 692 and drum 694, and a power-operated clutch actuator 698. As seen, the components of clutch actuator 698 are generally similar to those of clutch actuator 690 and, as such, are identified with a "B" suffix. Second torque coupling 656 is operable in a first or "released" mode so as to permit unrestricted relative rotation between first transfer shaft 660 and second transfer shaft 662. In contrast, second torque coupling 656 is also operable in a second or "locked" mode to couple second speed gear 682 to second transfer shaft 662, thereby increasing the rotary speed of second transfer shaft 662 relative to first transfer shaft 660. Thus, second torque coupling 656 functions in its locked mode to increase the rotary speed of right axleshaft 25R which, in turn, causes differential 530 to decrease the rotary speed of left axleshaft 25L, thereby directing more drive torque to right axleshaft 25R than is directed to left axleshaft 25L. Second torque coupling 656 is shifted between its released and locked modes via actuation of power-operated clutch actuator 698 in response to control signals from ECU 58.

Figure 17:
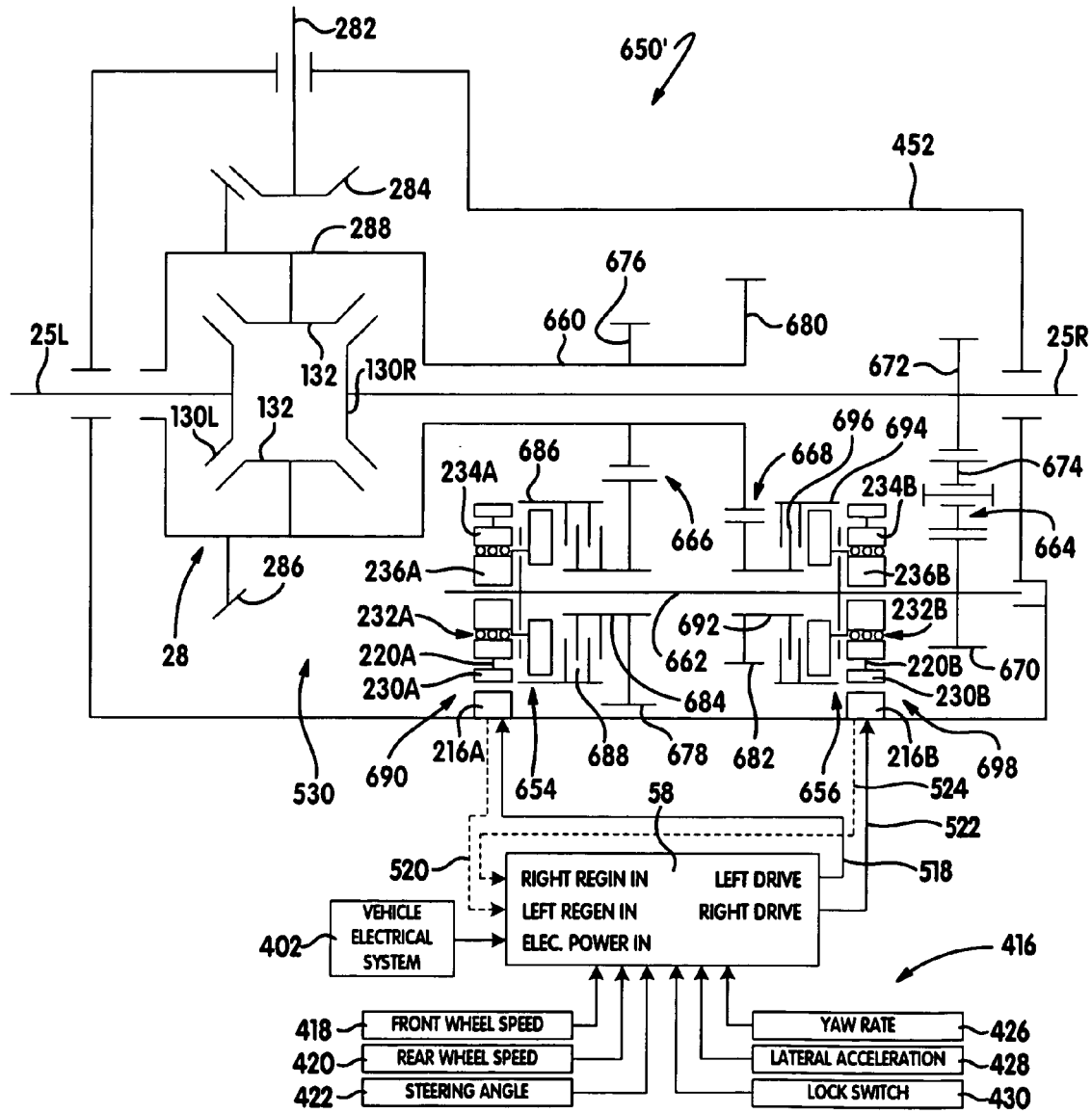

Referring now to FIG. 17, an alternative embodiment of torque distributing drive mechanism 650 of FIG. 16 is shown and designated by reference numeral 650'. Generally speaking, a large number of components are common to both drive mechanism 650 and 650', with such components being identified by the same reference numbers. However, a bevel differential 28 replaces planetary differential 530 and first transfer shaft 660 is now shown to be driven by the input component of bevel differential 28 instead of one of the output components of planetary differential 530. Bevel differential 28 includes a differential case 288 as its input component and left and right side gears 290L and 290R, respectively, as its output components.

Figure 18:
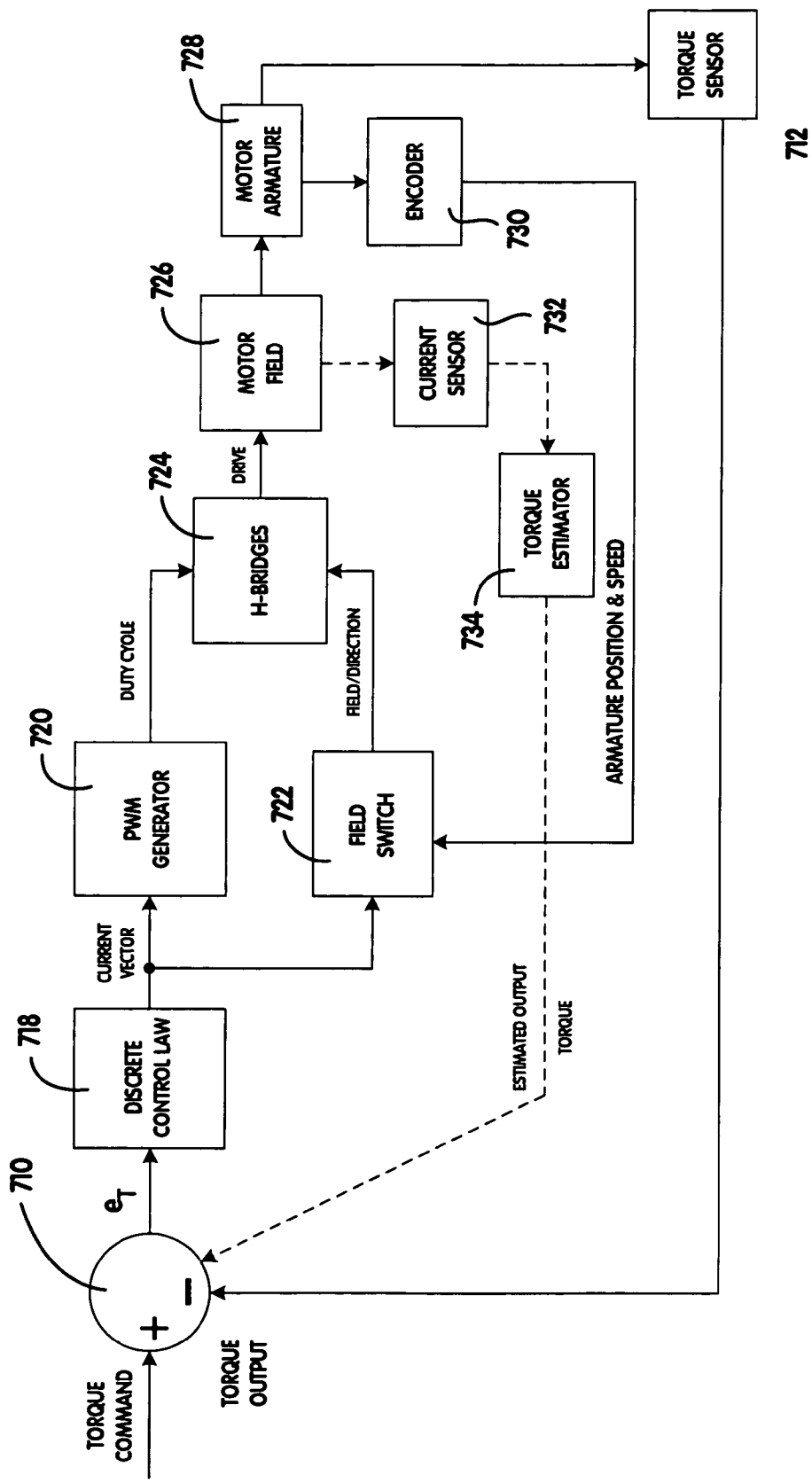
FIG. 18 is a block diagram of a control system for adaptive control of the torque transfer mechanisms.

Referring to FIG. 18, an exemplary circuit for the control system is shown. The torque command from controller 58 is delivered to a summing function 710 where the torque command value is compared to the actual torque output value measured by a torque sensor 712 on the output of the clutch assembly. A discrete control law function 718 has as its input the torque error ($e_T$) value outputted from summing function 710. Discrete control law function 718 transforms the torque error ($e_T$) into a signal that commands the subsequent functions to compensate for the error. Specifically, the output signal of control law function 718 commands the magnitude and sign of the clutch engagement force. A PWM (pulse width modulation) generator 720 receives the output signal from discrete control law function 718 and outputs a directly proportional duty cycle pulse train that controls the magnitude of the electric current sent to the coil of the motor/brake unit. A field switch 722 outputs binary signals that control the direction of rotation of the rotor of the motor/brake unit. These direction signals are dictated by the sign of the output signal from control law function 718. Hence, if the current vector is negative, the motor will turn one way, and if the current vector is positive, the motor will turn in the opposite direction. One direction of rotation acts to increase output torque, while the other reduces pressure on the clutch and thereby reduces the output torque.

An H-bridge circuit 724 is configured from four controlled switches (i.e., relay, transistor) that allows control of both the direction and magnitude of electric current through a load (i.e., motor). Two of the four switches are activated to direct current in a given direction. In addition, one of the two remaining devices is modulated so as to control the amount (magnitude) of current.

Motor field block 726 represents the coils and pole pieces of the windings associated with motor/brake units' field. Motor armature 728 is the rotating member of the motor (i.e., the rotor) that also carries the magnet pole pairs. An encoder 730 is a sensor that outputs a signal which identifies the position of the motor armature with respect to the field coils, as well as the speed and direction of motor rotation. This block is necessary for realizations where the motor is electrically commutated (i.e., brushless motors). As is obvious, torque sensor 712 outputs an electrical signal that is proportional to the torque applied to the device to which the sensor is attached. A current sensor 732 outputs an electrical signal that is proportional to the electrical current acting thereon. In the absence of a torque sensor, a torque estimator 734 can be employed to estimate the clutch output torque. It does so by operating mathematically on the current sensor's signal to provided an estimate of the output torque. In practice, this may be a simple linear relationship or a more complex function.

A control system for controlling operation of the motor/brake unit(s) will now be detailed. In general, the control system, and its associated algorithms, is employed to control a brushless dc motor-based clutch actuator assembly. The actuator assembly, in turn, permits modulated control of the torque outputted from its associated clutch assembly. The control system can receive a torque output command from a powertrain control module via a communications link. This command is translated into an electric current level for the brushless motor by the algorithms. A desired current level is maintained in the motor by a feedback control loop, either by sensing the actual motor current or by sensing the actual torque outputted by the clutch assembly. Commutation of the brushless motor drive is also performed by the controller. The motor position is relayed to the controller by the output state of three hall effect sensors embedded in the coil windings. The controller energizes the correct winding pair based on the output from the hall sensors and the desired direction of rotor rotation.

A number of preferred embodiments have been disclosed to provide those skilled in the art an understanding of the best mode currently contemplated for the operation and construction of the present invention. The invention being thus described, it will be obvious that various modifications can be made without departing from the true spirit and scope of the invention, and all such modifications as would be considered by those skilled in the art are intended to be included within the scope of the following claims.

What is claimed is:

1. A drive axle assembly for use in a motor vehicle having a powertrain and first and second wheels, comprising:
   an input shaft driven by the powertrain;
   a first axleshaft driving the first wheel;
   a second axleshaft driving the second wheel;
   a differential assembly having an input component driven by said input shaft, a first output component fixed for rotation with said first axleshaft, and a second output component fixed for rotation with said second axleshaft;
   a planetary gear assembly including a first sun gear, a second sun gear, a first ring gear coupled for rotation with said first output component, a second ring gear coupled for rotation with one of said input component and said second output component, first planet gears meshed with said first sun gear and said first ring gear, and second planet gears meshed with said second sun gear and said second ring gear;
   a first clutch for selectively braking rotation of said first sun gear;
   a first clutch actuator for controlling engagement of said first clutch and including a first electric motor operable in a motor mode and a brake mode;
   a second clutch for selectively inhibiting rotation of said second sun gear;
   a second clutch actuator for controlling engagement of said second clutch and including a second electric motor operable in a motor mode and a brake mode; and
   a control system for controlling actuation of said first and second electric motors between their respective motor and brake modes.

2. The drive axle assembly of claim 1 wherein said first electric motor is operable in each of its motor and brake modes for generating an output torque that is converted by a first conversion mechanism into a clutch engagement force applied to said first clutch, and wherein said first motor is operable in its brake mode to regenerate electrical power that can be used by said control system to selectively actuate said second clutch actuator.

3. The drive axle assembly of claim 2 wherein said control system provides electrical power to drive said first motor when operating in its motor mode, and wherein said control system extracts electrical power to brake said first motor when operating in its brake mode.

4. The drive axle assembly of claim 1 wherein said first clutch is operable in a first mode to permit unrestricted rotation of said first sun gear and in a second mode to prevent rotation of said first sun gear, wherein said second clutch is operable in a first mode to permit unrestricted rotation of said second sun gear and in a second mode to prevent rotation of said second sun gear.

5. The drive axle assembly of claim 4 wherein an overdrive mode is established when said first clutch is in its second mode and said second clutch is in its first mode such that said first axleshaft is driven at an increased rotary speed relative to said input component which causes said second axleshaft to be driven at a decreased rotary speed relative to said input component.

6. The drive axle assembly of claim 4 wherein an underdrive mode is established when said first clutch is in its first mode and said second clutch is in its second mode such that said first axleshaft is8 driven at a reduced rotary speed relative to said input component which causes said second axleshaft to be driven at a corresponding increased rotary speed.

7. The drive axle assembly of claim 4 wherein said first planet gears are rotatably supported from a first carrier fixed for rotation with said second ring gear and wherein said second planet gears are rotatably supported from a second carrier fixed for rotation with said first ring gear.

8. A drive axle assembly for use in a motor vehicle having a powertrain and first and second wheels, comprising:
  an input shaft driven by the powertrain;
  a first axleshaft driving the first wheel;
  a second axleshaft driving the second wheel;
  a differential assembly having an input component driven by said input shaft, a first output component fixed for rotation with said first axleshaft, and a second output component fixed for rotation with said second axleshaft;
  a first gearset having a first sun gear, a first ring gear, a first planet carrier fixed for rotation with one of said input component and said second output component of said differential, and first planet gears rotatably supported by said first planet carrier and meshed with said first sun gear and said first ring gear;
  a second gearset having a second sun gear, a second ring gear fixed for rotation with said first planet carrier, a second planet carrier fixed for rotation with said first axleshaft, and second planet gears rotatably supported by said second planet carrier and meshed with said second sun gear and said second ring gear;
  a first clutch for selectively braking rotation of said first sun gear;
  a first clutch actuator for controlling engagement of said first clutch and including a first electric motor operable in a motor mode and a brake mode;
  a second clutch for selectively inhibiting rotation of said second sun gear;
  a second clutch actuator for controlling engagement of said second clutch and including a second electric motor operable in a motor mode and a brake mode; and
  a control system for controlling actuation of said first and second electric motors between their respective motor and brake modes.

9. The drive axle assembly of claim 8 wherein said first electric motor is operable in each of its motor and brake modes for generating an output torque that is converted by a first conversion mechanism into a clutch engagement force applied to said first clutch, and wherein said first motor is operable in its brake mode to regenerate electrical power that can be used by said control system to selectively actuate said second clutch actuator.

10. The drive axle assembly of claim 9 wherein said control system provides electrical power to drive said first motor when operating in its motor mode, and wherein said control system extracts electrical power to brake said first motor when operating in its brake mode.

11. The drive axle assembly of claim 9 wherein said first conversion mechanism includes first and second components with said first component adapted to move axially in response to relative rotation between said first and second components for applying said clutch engagement force to said first clutch, wherein said first electric motor includes a first rotor that is fixed for rotation with said second component of said first conversion mechanism, and wherein said first motor is operable in its motor mode to drive said first rotor so as to cause relative rotation between said first and second components and is further operable in its brake mode to brake rotation of said first rotor so as to cause relative rotation between said first and second components.

12. The drive axle assembly of claim 11 wherein said a second electric motor is operable in each of its motor and brake modes for generating an output torque that is converted by a second conversion mechanism into a clutch engagement force applied to said second clutch, and wherein said second motor is operable in its brake mode to regenerate electrical power used by said control system to selectively actuate said first electric motor.

13. The drive axle assembly of claim 12 wherein said second conversion mechanism includes first and second components with said first component adapted to move axially in response to relative rotation between said first and second components for applying said clutch engagement force to said second clutch, wherein said second electric motor includes a second rotor that is fixed for rotation with said second component of said second conversion mechanism, and wherein said second motor is operable in its motor mode to drive said second rotor so as to cause relative rotation between said first and second components and is further operable in its brake mode to brake rotation of said second rotor so as to cause relative rotation between said first and second components.

14. The drive axle assembly of claim 8 wherein said first clutch is operable in a first mode to permit unrestricted rotation of said first sun gear and in a second mode to prevent rotation of said first sun gear, wherein said second clutch is operable in a first mode to permit unrestricted rotation of said second sun gear and in a second mode to prevent rotation of said second sun gear.

15. The drive axle assembly of claim 14 wherein an overdrive mode is established when said first clutch is in its second mode and said second clutch is in its first mode such that said first axleshaft is driven at an increased rotary speed relative to said input component which causes said second axleshaft to be driven at a decreased rotary speed relative to said input component.

16. The drive axle assembly of claim 14 wherein an underdrive mode is established when said first clutch is in its first mode and said second clutch is in its second mode such that said first axleshaft is 8 driven at a reduced rotary speed relative to said input component which causes said second axleshaft to be driven at a corresponding increased rotary speed.

17. A drive axle assembly for use in a motor vehicle having a powertrain and first and second wheels, comprising;
  an input shaft driven by the powertrain;
  a first axleshaft driving the first wheel;
  a second axleshaft driving the second wheel;
  a differential having an input component driven by said input shaft, a first output component driving said first axleshaft and a second output component driving said second axleshaft;
  a first speed changing unit having a first carrier driven by one of said input component and said second output component, a first ring gear, a first sun gear, and a set of first planet gears supported from said first carrier and meshed with said first sun gear and said first ring gear;

a second speed changing unit having a second carrier driven by said first output component, a second ring gear, a second sun gear, and a set of second planet gears supported from said second carrier and meshed with said second sun gear and said second ring gear;

a first clutch selectively engageable to brake rotation of said first sun gear;

a first clutch actuator for controlling engagement of said first clutch by shifting a first electric motor between a motor mode and a brake mode;

a second clutch selectively engageable to brake rotation of said second sun gear;

a second clutch actuator for controlling engagement of said second clutch by shifting a second electric motor between a motor mode and a brake mode; and a control system for selectively switching said first and second electric motors between their respective motor and brake modes.

18. The drive axle assembly of claim 17 wherein said first electric motor is operable in each of its motor and brake modes for generating an output torque that is converted by a first conversion mechanism into a clutch engagement force applied to said first clutch, and wherein said first electric motor is operable in its brake mode to regenerate electrical power that can be used by said control system to selectively actuate said second clutch actuator.

19. The drive axle assembly of claim 18 wherein said control system provides electrical power to drive said first electric motor when operating in its motor mode, and wherein said control system extracts electrical power to brake said first electric motor when operating in its brake mode.

20. The drive axle assembly of claim 17 wherein a first drive mode is established when said first clutch is engaged and said second clutch is released, whereby said first axleshaft is overdriven relative to said input component and said differential causes said second axleshaft to be underdriven relative to said input component, and wherein a second drive mode is established when said first clutch is released and said second clutch is engaged, whereby said second axleshaft is overdriven relative to said input component and said differential causes said first axleshaft to be underdriven relative to said input component.

\* \* \* \* \*